United States Patent
Wang et al.

(10) Patent No.: US 9,888,498 B2
(45) Date of Patent: Feb. 6, 2018

(54) METHOD FOR ACCESSING WIRELESS COMMUNICATION NODE, WIRELESS COMMUNICATION NODE, AND SYSTEM FOR ACCESSING WIRELESS COMMUNICATION NODE

(71) Applicant: HUAWEI TECHNOLOGIES CO., LTD., Shenzhen (CN)

(72) Inventors: Yan Wang, Beijing (CN); Yuhua Chen, Shenzhen (CN); Tao Zhang, Beijing (CN); Bo Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 146 days.

(21) Appl. No.: 14/810,769

(22) Filed: Jul. 28, 2015

(65) Prior Publication Data
US 2015/0334747 A1    Nov. 19, 2015

Related U.S. Application Data

(63) Continuation of application No. PCT/CN2013/071040, filed on Jan. 28, 2013.

(51) Int. Cl.
*H04W 74/08* (2009.01)
*H04W 74/00* (2009.01)
(Continued)

(52) U.S. Cl.
CPC ......... *H04W 74/0833* (2013.01); *H04W 4/00* (2013.01); *H04W 48/14* (2013.01); *H04W 74/006* (2013.01)

(58) Field of Classification Search
CPC ...... H04L 29/06; H04L 69/14; H04N 7/17309
See application file for complete search history.

(56) References Cited

U.S. PATENT DOCUMENTS 8,811,350 B2 * 8/2014 Chung ................. H04J 11/0093
370/280
2010/0303039 A1   12/2010 Zhang et al.
(Continued)

FOREIGN PATENT DOCUMENTS

CN    101826944    9/2010
CN    101873675    10/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300, V11.4.0, Dec. 2012, pp. 1-208.

(Continued)

*Primary Examiner* — Chandrahas Patel
(74) *Attorney, Agent, or Firm* — Staas & Halsey LLP

(57) ABSTRACT

Embodiments of the present invention provide a method for accessing a wireless communication node, a wireless communication node, and a system for accessing a wireless communication node. The method includes: receiving, by a second wireless communication node, a request message that is sent by a first wireless communication node; sending, a request response to the first wireless communication node; receiving, a second wireless communication node activation request; and sending, a random access indication message, so that the UE accesses the second wireless communication node. In the embodiments of the present invention, communication among a first wireless communication node that a UE has already accessed, a second wireless communication node that the UE expects to access, and the UE enables the first wireless communication node and the second wireless (Continued)

communication node to provide a service for the UE at the same time.

14 Claims, 10 Drawing Sheets

(51) Int. Cl.
   *H04W 48/14* (2009.01)
   *H04W 4/00* (2009.01)

(56) References Cited

U.S. PATENT DOCUMENTS

| | | | |
|---|---|---|---|
| 2011/0103331 | A1 | 5/2011 | Kuo |
| 2012/0002643 | A1 | 1/2012 | Chung et al. |
| 2012/0127908 | A1 | 5/2012 | Gao |
| 2013/0083759 | A1 | 4/2013 | Rong et al. |
| 2014/0010192 | A1 | 1/2014 | Chang et al. |
| 2014/0233535 | A1 | 8/2014 | Zhao et al. |
| 2015/0146665 | A1 | 5/2015 | Zhang et al. |

FOREIGN PATENT DOCUMENTS

| | | |
|---|---|---|
| CN | 101873715 | 10/2010 |
| CN | 102118801 A | 7/2011 |
| CN | 102349329 A | 2/2012 |
| CN | 102547928 | 7/2012 |
| CN | 102647265 | 8/2012 |
| CN | 102655682 | 9/2012 |
| WO | 2010/105145 A1 | 9/2010 |
| WO | 2012/169840 A2 | 12/2012 |
| WO | 2014019135 A1 | 2/2014 |

OTHER PUBLICATIONS

Extended European Search Report dated Dec. 18, 2015 in corresponding European Patent Application No. 13872894.4.
International Search Report dated Oct. 13, 2013 in corresponding PCT Application No. PCT/CN2013/071040.
PCT International Search Report dated Oct. 31, 2013 in corresponding International Patent Application No. PCT/CN2013/071040.
"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321, V11.1.0, Dec. 2012, pp. 1-57.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.2.0, Dec. 2012, pp. 1-340.
Chinese Office Action dated May 26, 2017 in corresponding Chinese Patent Application No. 201380002000.9.

* cited by examiner

METHOD FOR ACCESSING WIRELESS COMMUNICATION NODE, WIRELESS COMMUNICATION NODE, AND SYSTEM FOR ACCESSING WIRELESS COMMUNICATION NODE

CROSS-REFERENCE TO RELATED APPLICATIONS

This application is a continuation of International Application No. PCT/CN2013/071040, filed on Jan. 28, 2013, which is hereby incorporated by reference in its entirety.

TECHNICAL FIELD

Embodiments of the present invention relate to communication technologies, and in particular, to a method for accessing a wireless communication node, a wireless communication node, and a system for accessing a wireless communication node.

BACKGROUND

With continuous development of a Long Term Evolution (LTE) technology, a coordinated service between multiple types of base stations or multiple base stations is required, for example, in an inter-eNB coordinated multipoint transmission (inter-eNB CoMP) technology, an inter-eNB carrier aggregation (Inter-eNB CA) technology, an inter-eNB multiple streaming architecture (Inter-eNB MSA) technology, a heterogeneous network (HetNet), and a small cell enhancement technology.

Multiple wireless communication nodes need to serve a same user equipment (UE) in all the foregoing technologies, so as to increase a rate of data interaction between the UE and a network side. Therefore, how to enable multiple wireless communication nodes to provide a service for one UE at the same time becomes an urgent problem to be solved.

SUMMARY

In view of this, a method for accessing a wireless communication node, a wireless communication node, and a system for accessing a wireless communication node are provided, so as to enable multiple wireless communication nodes to provide a service for one UE at the same time.

According to a first aspect, a method for accessing a wireless communication node is provided, including:

receiving, by a second wireless communication node, a request message that is sent by a first wireless communication node and used to request the second wireless communication node to provide a service for a user equipment UE; sending, by the second wireless communication node, a request response to the first wireless communication node; receiving, by the second wireless communication node, a second wireless communication node activation request that is sent by the first wireless communication node after the first wireless communication node sends a second wireless communication node activation message to the UE; and sending, by the second wireless communication node, a random access indication message, so that the UE accesses the second wireless communication node in a case in which the UE accesses the first wireless communication node.

In a first possible implementation manner of the first aspect, the sending, by the second wireless communication node, a random access indication message, so that the UE accesses the second wireless communication node in a case in which the UE accesses the first wireless communication node includes: sending, by the second wireless communication node to the UE, a physical downlink control channel PDCCH message that includes a random access preamble, so that the UE accesses the second wireless communication node according to the random access preamble in a case in which the UE accesses the first wireless communication node.

According to the first possible implementation manner of the first aspect, in a second possible implementation manner of the first aspect, the request message or the second wireless communication node activation request includes a random access preamble that is allocated by the first wireless communication node to the UE and used to access the second wireless communication node; and the sending, by the second wireless communication node to the UE, a PDCCH message that includes a random access preamble includes: sending, by the second wireless communication node to the UE, a PDCCH message that includes the random access preamble allocated by the first wireless communication node.

According to the first or the second possible implementation manner of the first aspect, in a third possible implementation manner of the first aspect, the request message includes a first cell radio network temporary identifier C-RNTI used in the first wireless communication node by the UE, or the second wireless communication node activation request includes the first C-RNTI; and before the sending, by the second wireless communication node to the UE, a PDCCH message that includes a random access preamble, the method further includes: scrambling, by the second wireless communication node, the PDCCH message by using the first C-RNTI and a first physical cell identifier PCI of the first wireless communication node, or scrambling, by the second wireless communication node, the PDCCH message by using the first C-RNTI and a second PCI of the second wireless communication node.

According to one of the first to the third possible implementation manners of the first aspect, in a fourth possible implementation manner of the first aspect, after the sending, by the second wireless communication node to the UE, a PDCCH message that includes a random access preamble, the method further includes: receiving, by the second wireless communication node, a random access request that is sent by the UE and includes the random access preamble.

According to the third possible implementation manner of the first aspect, in a fifth possible implementation manner of the first aspect, before the scrambling, by the second wireless communication node, the PDCCH message by using the first C-RNTI and a second PCI of the second wireless communication node, the method further includes: receiving, by the second wireless communication node, a C-RNTI set that is sent by an operation, administration and maintenance OAM unit or the first wireless communication node and that is to be allocated by the second wireless communication node to the UE for use, where the C-RNTI set does not include the first C-RNTI.

According to the first or the second possible implementation manner of the first aspect, in a sixth possible implementation manner of the first aspect, the request response includes a second C-RNTI that is allocated by the second wireless communication node to the UE, so that the first wireless communication node sends the second C-RNTI to the UE; and before the sending, by the second wireless communication node to the UE, a PDCCH message that includes a random access preamble, the method further includes: scrambling, by the second wireless communication node, the PDCCH message by using the second C-RNTI and a second PCI of the second wireless communication node.

In a seventh possible implementation manner of the first aspect, the sending, by the second wireless communication node, a random access indication message, so that the UE accesses the second wireless communication node in a case in which the UE accesses the first wireless communication node includes: sending, by the second wireless communication node, to the first wireless communication node, a second wireless communication node activation response message that includes a random access preamble allocated by the second wireless communication node, so that the first wireless communication node sends, to the UE, a PDCCH message that includes the random access preamble, and then the UE accesses the second wireless communication node according to the random access preamble in a case in which the UE accesses the first wireless communication node.

According to the seventh possible implementation manner of the first aspect, in an eighth possible implementation manner of the first aspect, the request response or the second wireless communication node activation response message includes a second C-RNTI that is allocated by the second wireless communication node to the UE, so that the first wireless communication node scrambles the PDCCH message by using the second C-RNTI.

According to the seventh possible implementation manner of the first aspect, in a ninth possible implementation manner of the first aspect, the request message includes a first C-RNTI used in the first wireless communication node by the UE, or the second wireless communication node activation request includes the first C-RNTI, and after the second wireless communication node receives the second wireless communication node activation request, the second wireless communication node serves the UE by using the first C-RNTI.

According to the ninth possible implementation manner of the first aspect, in a tenth possible implementation manner of the first aspect, after the sending, by the second wireless communication node to the first wireless communication node, a second wireless communication node activation response message that includes a random access preamble allocated by the second wireless communication node, the method further includes: receiving, by the second wireless communication node, a random access request that is sent by the UE and includes the random access preamble.

According to the ninth possible implementation manner of the first aspect, in an eleventh possible implementation manner of the first aspect, before the receiving, by the second wireless communication node, a second wireless communication node activation request that is sent by the first wireless communication node, the method further includes: receiving, by the second wireless communication node, a C-RNTI set that is sent by an operation, administration and maintenance OAM unit or the first wireless communication node and that is to be allocated by the second wireless communication node to the UE for use, where the C-RNTI set does not include the first C-RNTI.

According to the fourth or the tenth possible implementation manner of the first aspect, in a twelfth possible implementation manner of the first aspect, after the receiving, by the second wireless communication node, a random access request that is sent by the UE and includes the random access preamble, the method further includes: sending, by the second wireless communication node to the UE, a random access response that includes a second C-RNTI, where the second C-RNTI is a C-RNTI that is allocated by the second wireless communication node to the UE.

According to the first aspect or one of the foregoing twelve possible implementation manners of the first aspect, in a thirteenth possible implementation manner of the first aspect, the request message includes: a UE context setup request, a bearer setup request, a handover request, a coordinated service request, or a secondary cell transmission request.

According to the first aspect or one of the foregoing twelve possible implementation manners of the first aspect, in a fourteenth possible implementation manner of the first aspect, the request message includes: an application-layer protocol identifier APID that is allocated by the first wireless communication node to the UE, and an identifier of the second wireless communication node.

According to the fourteenth possible implementation manner of the first aspect, in a fifteenth possible implementation manner of the first aspect, the identifier of the second wireless communication node includes one or a combination of: an E-UTRAN cell global identifier, the second physical cell identifier PCI, and a frequency of the second wireless communication node that are corresponding to the second wireless communication node.

According to a second aspect, another method for accessing a wireless communication node is provided, including:

sending, by a first wireless communication node to a second wireless communication node, a request message used to request the second wireless communication node to provide a service for a user equipment UE; receiving, by the first wireless communication node, a request response sent by the second wireless communication node; sending, by the first wireless communication node, a second wireless communication node activation message to the UE; and sending, by the first wireless communication node, a second wireless communication node activation request to the second wireless communication node, so that the second wireless communication node sends a random access indication message to instruct the UE to access the second wireless communication node in a case in which the UE accesses the first wireless communication node.

In a first possible implementation manner of the second aspect, the sending, by the first wireless communication node, a second wireless communication node activation request to the second wireless communication node, so that the second wireless communication node sends a random access indication message to instruct the UE to access the second wireless communication node in a case in which the UE accesses the first wireless communication node includes: sending, by the first wireless communication node, the second wireless communication node activation request to the second wireless communication node, so that the second wireless communication node sends, to the UE, a physical downlink control channel PDCCH message that includes a random access preamble, so as to instruct the UE to access the second wireless communication node according to the random access preamble in a case in which the UE accesses the first wireless communication node.

According to the first possible implementation manner of the second aspect, in a second possible implementation manner of the second aspect, the request message or the second wireless communication node activation request includes a random access preamble that is allocated by the first wireless communication node to the UE and used to access the second wireless communication node; and the sending, by the first wireless communication node, the second wireless communication node activation request to the second wireless communication node, so that the second wireless communication node sends, to the UE, a PDCCH message that includes a random access preamble, so as to instruct the UE to access the second wireless communication node according to the random access preamble includes: sending, by the first wireless communication node, the second wireless communication node activation request to the second wireless communication node, so that the second wireless communication node sends, to the UE, a PDCCH message that includes the random access preamble allocated by the first wireless communication node, so as to instruct the UE to access the second wireless communication node according to the random access preamble allocated by the first wireless communication node.

According to the first or the second possible implementation manner of the second aspect, in a third possible implementation manner of the second aspect, the request message includes a first cell radio network temporary identifier C-RNTI used in the first wireless communication node by the UE, or the second wireless communication node activation request includes the first C-RNTI, so that before sending, to the UE, the PDCCH message that includes the random access preamble, the second wireless communication node scrambles the PDCCH message by using the first C-RNTI and a physical cell identifier PCI of the first wireless communication node, or scrambles the PDCCH message by using the first C-RNTI and a second PCI of the second wireless communication node.

According to one of the first to the third possible implementation manners of the second aspect, in a fourth possible implementation manner of the second aspect, the first wireless communication node sends the second wireless communication node activation request to the second wireless communication node, so that after sending, to the UE, the PDCCH message that includes the random access preamble, the second wireless communication node receives a random access request that is sent by the UE and includes the random access preamble.

According to the third possible implementation manner of the second aspect, in a fifth possible implementation manner of the second aspect, the request message includes the first C-RNTI used in the first wireless communication node by the UE, or the second wireless communication node activation request includes the first C-RNTI, so that before sending, to the UE, the PDCCH message that includes the random access preamble, the second wireless communication node scrambles the PDCCH message by using the first C-RNTI and the second PCI of the second wireless communication node; and before this, the method further includes: sending, by the first wireless communication node to the second wireless communication node, a C-RNTI set that is to be allocated by the second wireless communication node to the UE for use, where the C-RNTI set does not include the first C-RNTI.

According to the first or the second possible implementation manner of the second aspect, in a sixth possible implementation manner of the second aspect, the request response includes a second C-RNTI that is allocated by the second wireless communication node to the UE, and the first wireless communication node sends the second C-RNTI to the UE.

In a seventh possible implementation manner of the second aspect, after the sending, by the first wireless communication node, a second wireless communication node activation request to the second wireless communication node, the method further includes: receiving, by the first wireless communication node, a second wireless communication node activation response message that is sent by the second wireless communication node and includes a random access preamble allocated by the second wireless communication node; and sending, by the first wireless communication node to the UE, a PDCCH message that includes the random access preamble, so that the UE accesses the second wireless communication node according to the random access preamble in a case in which the UE accesses the first wireless communication node.

According to the seventh possible implementation manner of the second aspect, in an eighth possible implementation manner of the second aspect, the request response or the second wireless communication node activation response message includes a second C-RNTI that is allocated by the second wireless communication node to the UE; and before the sending, by the first wireless communication node to the UE, a PDCCH message that includes the random access preamble, the method further includes: scrambling, by the first wireless communication node, the PDCCH message by using the second C-RNTI and a first physical cell identifier PCI of the first wireless communication node.

According to the seventh possible implementation manner of the second aspect, in a ninth possible implementation manner of the second aspect, before the sending, by the first wireless communication node to the UE, a PDCCH message that includes the random access preamble, the method further includes: scrambling, by the first wireless communication node, the PDCCH message by using a first C-RNTI and a first physical cell identifier PCI of the first wireless communication node, where the first C-RNTI is a C-RNTI used in the first wireless communication node by the UE.

According to the ninth possible implementation manner of the second aspect, in a tenth possible implementation manner of the second aspect, the request message includes the first C-RNTI used in the first wireless communication node by the UE, or the second wireless communication node activation request includes the first C-RNTI, so that the second wireless communication node serves the UE by using the first C-RNTI.

According to the tenth possible implementation manner of the second aspect, in an eleventh possible implementation manner of the second aspect, the sending, by the first wireless communication node to the UE, a PDCCH message that includes the random access preamble, so that the UE accesses the second wireless communication node according to the random access preamble includes: sending, by the first wireless communication node to the UE, the PDCCH message that includes the random access preamble, so that the UE sends, to the second wireless communication node, a random access request that includes the random access preamble.

According to the tenth possible implementation manner of the second aspect, in a twelfth possible implementation manner of the second aspect, before the sending, by the first wireless communication node, a second wireless communication node activation request to the second wireless communication node, the method further includes: sending, by the first wireless communication node to the second wireless communication node, a C-RNTI set that is to be allocated by the second wireless communication node to the UE for use, where the C-RNTI set does not include the first C-RNTI.

According to the second aspect or one of the foregoing twelve possible implementation manners of the second aspect, in a thirteenth possible implementation manner of the second aspect, the request message includes: a UE context setup request, a bearer setup request, a handover request, a coordinated service request, or a secondary cell transmission request.

According to the second aspect or one of the foregoing twelve possible implementation manners of the second aspect, in a fourteenth possible implementation manner of the second aspect, the request message includes: an application-layer protocol identifier APID that is allocated by the first wireless communication node to the UE, and an identifier of the second wireless communication node.

According to the fourteenth possible implementation manner of the second aspect, in a fifteenth possible implementation manner of the second aspect, the identifier of the second wireless communication node includes one or a combination of: an E-UTRAN cell global identifier, the second physical cell identifier PCI, and a frequency of the second wireless communication node that are corresponding to the second wireless communication node.

According to a third aspect, a wireless communication node is provided, where the wireless communication node is a second wireless communication node, and the wireless communication node includes:

a receiving module, configured to receive a request message that is sent by a first wireless communication node and used to request the second wireless communication node to provide a service for a user equipment UE; and a sending module, configured to send a request response to the first wireless communication node; where the receiving module is further configured to receive a second wireless communication node activation request that is sent by the first wireless communication node after the first wireless communication node sends a second wireless communication node activation message to the UE; and the sending module is further configured to send a random access indication message, so that the UE accesses the second wireless communication node in a case in which the UE accesses the first wireless communication node.

In a first possible implementation manner of the third aspect, the sending module is specifically configured to send, to the UE, a physical downlink control channel PDCCH message that includes a random access preamble, so that the UE accesses the second wireless communication node according to the random access preamble in a case in which the UE accesses the first wireless communication node.

According to the first possible implementation manner of the third aspect, in a second possible implementation manner of the third aspect, the request message or the second wireless communication node activation request includes a random access preamble that is allocated by the first wireless communication node to the UE and used to access the second wireless communication node; and the sending module is specifically configured to send, to the UE, a PDCCH message that includes the random access preamble that is allocated by the first wireless communication node to the UE and used to access the second wireless communication node.

According to the first or the second possible implementation manner of the third aspect, in a third possible implementation manner of the third aspect, the request message includes a first cell radio network temporary identifier C-RNTI used in the first wireless communication node by the UE, or the second wireless communication node activation request includes the first C-RNTI; and correspondingly, the second wireless communication node further includes: a scrambling module, configured to scramble the PDCCH message by using the first C-RNTI and a first physical cell identifier PCI of the first wireless communication node, or scramble the PDCCH message by using the first C-RNTI and a second PCI of the second wireless communication node.

According to one of the first to the third possible implementation manners of the third aspect, in a fourth possible implementation manner of the third aspect, the receiving module is further configured to receive a random access request that is sent by the UE and includes the random access preamble.

According to the third possible implementation manner of the third aspect, in a fifth possible implementation manner of the third aspect, the receiving module is further configured to receive a C-RNTI set that is sent by an operation, administration and maintenance OAM unit or the first wireless communication node and that is to be allocated by the second wireless communication node to the UE for use, where the C-RNTI set does not include the first C-RNTI.

According to the first or the second possible implementation manner of the third aspect, in a sixth possible implementation manner of the third aspect, the request response includes a second C-RNTI that is allocated by the second wireless communication node to the UE, so that the first wireless communication node sends the second C-RNTI to the UE; and correspondingly, the second wireless communication node further includes: a scrambling module, configured to scramble the PDCCH message by using the second C-RNTI and a second PCI of the second wireless communication node.

In a seventh possible implementation manner of the third aspect, the sending module is specifically configured to send, to the first wireless communication node, a second wireless communication node activation response message that includes a random access preamble allocated by the second wireless communication node, so that the first wireless communication node sends, to the UE, a PDCCH message that includes the random access preamble, and then the UE accesses the second wireless communication node according to the random access preamble in a case in which the UE accesses the first wireless communication node.

According to the seventh possible implementation manner of the third aspect, in an eighth possible implementation manner of the third aspect, the request response or the second wireless communication node activation response message includes a second C-RNTI that is allocated by the second wireless communication node to the UE, so that the first wireless communication node scrambles the PDCCH message by using the second C-RNTI.

According to the seventh possible implementation manner of the third aspect, in a ninth possible implementation manner of the third aspect, the request message includes a first C-RNTI used in the first wireless communication node by the UE, or the second wireless communication node activation request includes the first C-RNTI, and the second wireless communication node serves the UE by using the first C-RNTI.

According to the ninth possible implementation manner of the third aspect, in a tenth possible implementation manner of the third aspect, the receiving module is further configured to receive a random access request that is sent by the UE and includes the random access preamble.

According to the ninth possible implementation manner of the third aspect, in an eleventh possible implementation manner of the third aspect, the receiving module is further configured to receive a C-RNTI set that is sent by an operation, administration and maintenance OAM unit or the first wireless communication node and that is to be allocated by the second wireless communication node to the UE for use, where the C-RNTI set does not include the first C-RNTI.

According to the fourth or the tenth possible implementation manner of the third aspect, in a twelfth possible implementation manner of the third aspect, the sending module is further configured to send, to the UE, a random access response that includes a second C-RNTI, where the second C-RNTI is a C-RNTI that is allocated by the second wireless communication node to the UE.

According to the third aspect or one of the foregoing twelve possible implementation manners of the third aspect, in a thirteenth possible implementation manner of the third aspect, the request message includes: a UE context setup request, a bearer setup request, a handover request, a coordinated service request, or a secondary cell transmission request.

According to the third aspect or one of the foregoing twelve possible implementation manners of the third aspect, in a fourteenth possible implementation manner of the third aspect, the request message includes: an application-layer protocol identifier APID that is allocated by the first wireless communication node to the UE, and an identifier of the second wireless communication node.

According to the fourteenth possible implementation manner of the third aspect, in a fifteenth possible implementation manner of the third aspect, the identifier of the second wireless communication node includes one or a combination of: an E-UTRAN cell global identifier, the second physical cell identifier PCI, and a frequency of the second wireless communication node that are corresponding to the second wireless communication node.

According to a fourth aspect, another wireless communication node is provided, where the wireless communication node is a first wireless communication node, and the wireless communication node includes:

a sending module, configured to send, to a second wireless communication node, a request message used to request the second wireless communication node to provide a service for a user equipment UE; and a receiving module, configured to receive a request response sent by the second wireless communication node; where the sending module is further configured to send a second wireless communication node activation message to the UE; and the sending module is further configured to send a second wireless communication node activation request to the second wireless communication node, so that the second wireless communication node sends a random access indication message to instruct the UE to access the second wireless communication node in a case in which the UE accesses the first wireless communication node.

In a first possible implementation manner of the fourth aspect, the sending module is specifically configured to send the second wireless communication node activation request to the second wireless communication node, so that the second wireless communication node sends, to the UE, a physical downlink control channel PDCCH message that includes a random access preamble, so as to instruct the UE to access the second wireless communication node according to the random access preamble in a case in which the UE accesses the first wireless communication node.

According to the first possible implementation manner of the fourth aspect, in a second possible implementation manner of the fourth aspect, the request message or the second wireless communication node activation request includes a random access preamble that is allocated by the first wireless communication node to the UE and used to access the second wireless communication node; and the sending module is further configured to send the second wireless communication node activation request to the second wireless communication node, so that the second wireless communication node sends, to the UE, a PDCCH message that includes the random access preamble allocated by the first wireless communication node, so as to instruct the UE to access the second wireless communication node according to the random access preamble that is allocated by the first wireless communication node to the UE and used to access the second wireless communication node.

According to the first or the second possible implementation manner of the fourth aspect, in a third possible implementation manner of the fourth aspect, the request message includes a first cell radio network temporary identifier C-RNTI used in the first wireless communication node by the UE, or the second wireless communication node activation request includes the first C-RNTI, so that before sending, to the UE, the PDCCH message that includes the random access preamble, the second wireless communication node scrambles the PDCCH message by using the first C-RNTI and a physical cell identifier PCI of the first wireless communication node, or scrambles the PDCCH message by using the first C-RNTI and a second PCI of the second wireless communication node.

According to one of the first to the third possible implementation manners of the fourth aspect, in a fourth possible implementation manner of the fourth aspect, the sending module is further configured to send the second wireless communication node activation request to the second wireless communication node, so that after sending, to the UE, the PDCCH message that includes the random access preamble, the second wireless communication node receives a random access request that is sent by the UE and includes the random access preamble.

According to the third possible implementation manner of the fourth aspect, in a fifth possible implementation manner of the fourth aspect, the sending module is further configured to send, to the second wireless communication node, a C-RNTI set that is to be allocated by the second wireless communication node to the UE for use, where the C-RNTI set does not include the first C-RNTI.

According to the first or the second possible implementation manner of the fourth aspect, in a sixth possible implementation manner of the fourth aspect, the request response includes a second C-RNTI that is allocated by the second wireless communication node to the UE, and correspondingly, the sending module is further configured to send the second C-RNTI to the UE.

In a seventh possible implementation manner of the fourth aspect, the receiving module is further configured to receive a second wireless communication node activation response message that is sent by the second wireless communication node and includes a random access preamble allocated by the second wireless communication node; and the sending module is further configured to send, to the UE, a PDCCH message that includes the random access preamble, so that the UE accesses the second wireless communication node according to the random access preamble in a case in which the UE accesses the first wireless communication node.

According to the seventh possible implementation manner of the fourth aspect, in an eighth possible implementation manner of the fourth aspect, the request response or the second wireless communication node activation response message includes a second C-RNTI that is allocated by the second wireless communication node to the UE; and correspondingly, the first wireless communication node further includes: a scrambling module, configured to scramble the PDCCH message by using the second C-RNTI and a first physical cell identifier PCI of the first wireless communication node.

According to the seventh possible implementation manner of the fourth aspect, in a ninth possible implementation manner of the fourth aspect, the first wireless communication node further includes: a scrambling module, configured to scramble the PDCCH message by using a first C-RNTI and a first physical cell identifier PCI of the first wireless communication node, where the first C-RNTI is a C-RNTI used in the first wireless communication node by the UE.

According to the ninth possible implementation manner of the fourth aspect, in a tenth possible implementation manner of the fourth aspect, the request message includes the first C-RNTI used in the first wireless communication node by the UE, or the second wireless communication node activation request includes the first C-RNTI, so that the second wireless communication node serves the UE by using the first C-RNTI.

According to the tenth possible implementation manner of the fourth aspect, in an eleventh possible implementation manner of the fourth aspect, the sending module is specifically configured to send, to the UE, the PDCCH message that includes the random access preamble, so that the UE sends, to the second wireless communication node, a random access request that includes the random access preamble.

According to the tenth possible implementation manner of the fourth aspect, in a twelfth possible implementation manner of the fourth aspect, the sending module is specifically configured to send, to the second wireless communication node, a C-RNTI set that is to be allocated by the second wireless communication node to the UE for use, where the C-RNTI set does not include the first C-RNTI.

According to the fourth aspect or one of the foregoing twelve possible implementation manners of the fourth aspect, in a thirteenth possible implementation manner of the fourth aspect, the request message includes: a UE context setup request, a bearer setup request, a handover request, a coordinated service request, or a secondary cell transmission request.

According to the fourth aspect or one of the foregoing twelve possible implementation manners of the fourth aspect, in a fourteenth possible implementation manner of the fourth aspect, the request message includes: an application-layer protocol identifier APID that is allocated by the first wireless communication node to the UE, and an identifier of the second wireless communication node.

According to the fourteenth possible implementation manner of the fourth aspect, in a fifteenth possible implementation manner of the fourth aspect, the identifier of the second wireless communication node includes one or a combination of: an E-UTRAN cell global identifier, the second physical cell identifier PCI, and a frequency of the second wireless communication node that are corresponding to the second wireless communication node.

According to a fifth aspect, a system for accessing a wireless communication node is provided, including: the wireless communication node according to any one of the possible implementation manners in the third aspect, and the wireless communication node according to any one of the possible implementation manners in the fourth aspect.

According to a sixth aspect, still another wireless communication node is provided, where the wireless communication node is a second wireless communication node, and the wireless communication node includes:

a receiver, configured to receive a request message that is sent by a first wireless communication node and used to request the second wireless communication node to provide a service for a user equipment UE; and a transmitter, configured to send a request response to the first wireless communication node; where the receiver is further configured to receive a second wireless communication node activation request that is sent by the first wireless communication node after the first wireless communication node sends a second wireless communication node activation message to the UE; and the transmitter is further configured to send a random access indication message, so that the UE accesses the second wireless communication node in a case in which the UE accesses the first wireless communication node.

In a first possible implementation manner of the sixth aspect, the transmitter is specifically configured to send, to the UE, a physical downlink control channel PDCCH message that includes a random access preamble, so that the UE accesses the second wireless communication node according to the random access preamble in a case in which the UE accesses the first wireless communication node.

According to the first possible implementation manner of the sixth aspect, in a second possible implementation manner of the sixth aspect, the request message or the second wireless communication node activation request includes a random access preamble that is allocated by the first wireless communication node to the UE and used to access the second wireless communication node; and the transmitter is specifically configured to send, to the UE, a PDCCH message that includes the random access preamble allocated by the first wireless communication node.

According to the first or the second possible implementation manner of the sixth aspect, in a third possible implementation manner of the sixth aspect, the request message includes a first cell radio network temporary identifier C-RNTI used in the first wireless communication node by the UE, or the second wireless communication node activation request includes the first C-RNTI; and correspondingly, the second wireless communication node further includes: a processor, configured to scramble the PDCCH message by using the first C-RNTI and a first physical cell identifier PCI of the first wireless communication node, or scramble the PDCCH message by using the first C-RNTI and a second PCI of the second wireless communication node.

According to one of the first to the third possible implementation manners of the sixth aspect, in a fourth possible implementation manner of the sixth aspect, the receiver is further configured to receive a random access request that is sent by the UE and includes the random access preamble.

According to the third possible implementation manner of the sixth aspect, in a fifth possible implementation manner of the sixth aspect, the receiver is further configured to receive a C-RNTI set that is sent by an operation, administration and maintenance OAM unit or the first wireless communication node and that is to be allocated by the second wireless communication node to the UE for use, where the C-RNTI set does not include the first C-RNTI.

According to the first or the second possible implementation manner of the sixth aspect, in a sixth possible implementation manner of the sixth aspect, the request response includes a second C-RNTI that is allocated by the second wireless communication node to the UE, so that the first wireless communication node sends the second C-RNTI to the UE; and correspondingly, the second wireless communication node further includes: a processor, configured to scramble the PDCCH message by using the second C-RNTI and a second PCI of the second wireless communication node.

In a seventh possible implementation manner of the sixth aspect, the transmitter is specifically configured to send, to the first wireless communication node, a second wireless communication node activation response message that includes a random access preamble allocated by the second wireless communication node, so that the first wireless communication node sends, to the UE, a PDCCH message that includes the random access preamble, and then the UE accesses the second wireless communication node according to the random access preamble in a case in which the UE accesses the first wireless communication node.

According to the seventh possible implementation manner of the sixth aspect, in an eighth possible implementation manner of the sixth aspect, the request response or the second wireless communication node activation response message includes a second C-RNTI that is allocated by the second wireless communication node to the UE, so that the first wireless communication node scrambles the PDCCH message by using the second C-RNTI.

According to the seventh possible implementation manner of the sixth aspect, in a ninth possible implementation manner of the sixth aspect, the request message includes a first C-RNTI used in the first wireless communication node by the UE, or the second wireless communication node activation request includes the first C-RNTI, and the second wireless communication node serves the UE by using the first C-RNTI.

According to the ninth possible implementation manner of the sixth aspect, in a tenth possible implementation manner of the sixth aspect, the receiver is further configured to receive a random access request that is sent by the UE and includes the random access preamble.

According to the ninth possible implementation manner of the sixth aspect, in an eleventh possible implementation manner of the sixth aspect, the receiver is further configured to receive a C-RNTI set that is sent by an operation, administration and maintenance OAM unit or the first wireless communication node and that is to be allocated by the second wireless communication node to the UE for use, where the C-RNTI set does not include the first C-RNTI.

According to the fourth or the tenth possible implementation manner of the sixth aspect, in a twelfth possible implementation manner of the sixth aspect, the transmitter is further configured to send, to the UE, a random access response that includes a second C-RNTI, where the second C-RNTI is a C-RNTI that is allocated by the second wireless communication node to the UE.

According to the sixth aspect or one of the foregoing twelve possible implementation manners of the sixth aspect, in a thirteenth possible implementation manner of the sixth aspect, the request message includes: a UE context setup request, a bearer setup request, a handover request, a coordinated service request, or a secondary cell transmission request.

According to the sixth aspect or one of the foregoing twelve possible implementation manners of the sixth aspect, in a fourteenth possible implementation manner of the sixth aspect, the request message includes: an application-layer protocol identifier APID that is allocated by the first wireless communication node to the UE, and an identifier of the second wireless communication node.

According to the fourteenth possible implementation manner of the sixth aspect, in a fifteenth possible implementation manner of the sixth aspect, the identifier of the second wireless communication node includes one or a combination of: an E-UTRAN cell global identifier, the second physical cell identifier PCI, and a frequency of the second wireless communication node that are corresponding to the second wireless communication node.

According to a seventh aspect, yet another wireless communication node is provided, where the wireless communication node is a first wireless communication node, and the wireless communication node includes:

a transmitter, configured to send, to a second wireless communication node, a request message used to request the second wireless communication node to provide a service for a user equipment UE; and a receiver, configured to receive a request response sent by the second wireless communication node; where the transmitter is further configured to send a second wireless communication node activation message to the UE; and the transmitter is further configured to send a second wireless communication node activation request to the second wireless communication node, so that the second wireless communication node sends a random access indication message to instruct the UE to access the second wireless communication node in a case in which the UE accesses the first wireless communication node.

In a first possible implementation manner of the seventh aspect, the transmitter is specifically configured to send the second wireless communication node activation request to the second wireless communication node, so that the second wireless communication node sends, to the UE, a physical downlink control channel PDCCH message that includes a random access preamble, so as to instruct the UE to access the second wireless communication node according to the random access preamble in a case in which the UE accesses the first wireless communication node.

According to the first possible implementation manner of the seventh aspect, in a second possible implementation manner of the seventh aspect, the request message or the second wireless communication node activation request includes a random access preamble that is allocated by the first wireless communication node to the UE and used to access the second wireless communication node; and the transmitter is further configured to send the second wireless communication node activation request to the second wireless communication node, so that the second wireless communication node sends, to the UE, a PDCCH message that includes the random access preamble allocated by the first wireless communication node, so as to instruct the UE to access the second wireless communication node according to the random access preamble allocated by the first wireless communication node.

According to the first or the second possible implementation manner of the seventh aspect, in a third possible implementation manner of the seventh aspect, the request message includes a first cell radio network temporary identifier C-RNTI used in the first wireless communication node by the UE, or the second wireless communication node activation request includes the first C-RNTI, so that before sending, to the UE, the PDCCH message that includes the random access preamble, the second wireless communication node scrambles the PDCCH message by using the first C-RNTI and a physical cell identifier PCI of the first wireless communication node, or scrambles the PDCCH message by using the first C-RNTI and a second PCI of the second wireless communication node.

According to one of the first to the third possible implementation manners of the seventh aspect, in a fourth possible implementation manner of the seventh aspect, the transmitter is further configured to send the second wireless communication node activation request to the second wireless communication node, so that after sending, to the UE, the PDCCH message that includes the random access preamble, the second wireless communication node receives a random access request that is sent by the UE and includes the random access preamble.

According to the third possible implementation manner of the seventh aspect, in a fifth possible implementation manner of the seventh aspect, the transmitter is further configured to send, to the second wireless communication node, a C-RNTI set that is to be allocated by the second wireless communication node to the UE for use, where the C-RNTI set does not include the first C-RNTI.

According to the first or the second possible implementation manner of the seventh aspect, in a sixth possible implementation manner of the seventh aspect, the request response includes a second C-RNTI that is allocated by the second wireless communication node to the UE; and the transmitter is further configured to send the second C-RNTI to the UE.

In a seventh possible implementation manner of the seventh aspect, the receiver is further configured to receive a second wireless communication node activation response message that is sent by the second wireless communication node and includes a random access preamble allocated by the second wireless communication node; and the transmitter is further configured to send, to the UE, a PDCCH message that includes the random access preamble, so that the UE accesses the second wireless communication node according to the random access preamble in a case in which the UE accesses the first wireless communication node.

According to the seventh possible implementation manner of the seventh aspect, in an eighth possible implementation manner of the seventh aspect, the request response or the second wireless communication node activation response message includes a second C-RNTI that is allocated by the second wireless communication node to the UE; and correspondingly, the first wireless communication node further includes: a processor, configured to scramble the PDCCH message by using the second C-RNTI and a first physical cell identifier PCI of the first wireless communication node.

According to the seventh possible implementation manner of the seventh aspect, in a ninth possible implementation manner of the seventh aspect, the first wireless communication node further includes: a processor, configured to scramble the PDCCH message by using a first C-RNTI and a first physical cell identifier PCI of the first wireless communication node, where the first C-RNTI is a C-RNTI used in the first wireless communication node by the UE.

According to the ninth possible implementation manner of the seventh aspect, in a tenth possible implementation manner of the seventh aspect, the request message includes the first C-RNTI used in the first wireless communication node by the UE, or the second wireless communication node activation request includes the first C-RNTI, so that the second wireless communication node serves the UE by using the first C-RNTI.

According to the tenth possible implementation manner of the seventh aspect, in an eleventh possible implementation manner of the seventh aspect, the transmitter is specifically configured to send, to the UE, the PDCCH message that includes the random access preamble, so that the UE sends, to the second wireless communication node, a random access request that includes the random access preamble.

According to the tenth possible implementation manner of the seventh aspect, in a twelfth possible implementation manner of the seventh aspect, the transmitter is specifically configured to send, to the second wireless communication node, a C-RNTI set that is to be allocated by the second wireless communication node to the UE for use, where the C-RNTI set does not include the first C-RNTI.

According to the seventh aspect or one of the foregoing twelve possible implementation manners of the seventh aspect, in a thirteenth possible implementation manner of the seventh aspect, the request message includes: a UE context setup request, a bearer setup request, a handover request, a coordinated service request, or a secondary cell transmission request.

According to the seventh aspect or one of the foregoing twelve possible implementation manners of the seventh aspect, in a fourteenth possible implementation manner of the seventh aspect, the request message includes: an application-layer protocol identifier APID that is allocated by the first wireless communication node to the UE, and an identifier of the second wireless communication node.

According to the fourteenth possible implementation manner of the seventh aspect, in a fifteenth possible implementation manner of the seventh aspect, the identifier of the second wireless communication node includes one or a combination of: an E-UTRAN cell global identifier, the second physical cell identifier PCI, and a frequency of the second wireless communication node that are corresponding to the second wireless communication node.

According to an eighth aspect, a system for accessing a wireless communication node is provided, including:

the wireless communication node according to any one of the possible implementation manners in the sixth aspect, and the wireless communication node according to any one of the possible implementation manners in the seventh aspect.

According to the method for accessing a wireless communication node, the wireless communication node, and the system for accessing a wireless communication node that are provided in the foregoing eight aspects, communication among a first wireless communication node that a UE has already accessed, a second wireless communication node that the UE expects to access, and the UE enables the first wireless communication node and the second wireless communication node to provide a service for the UE at the same time.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
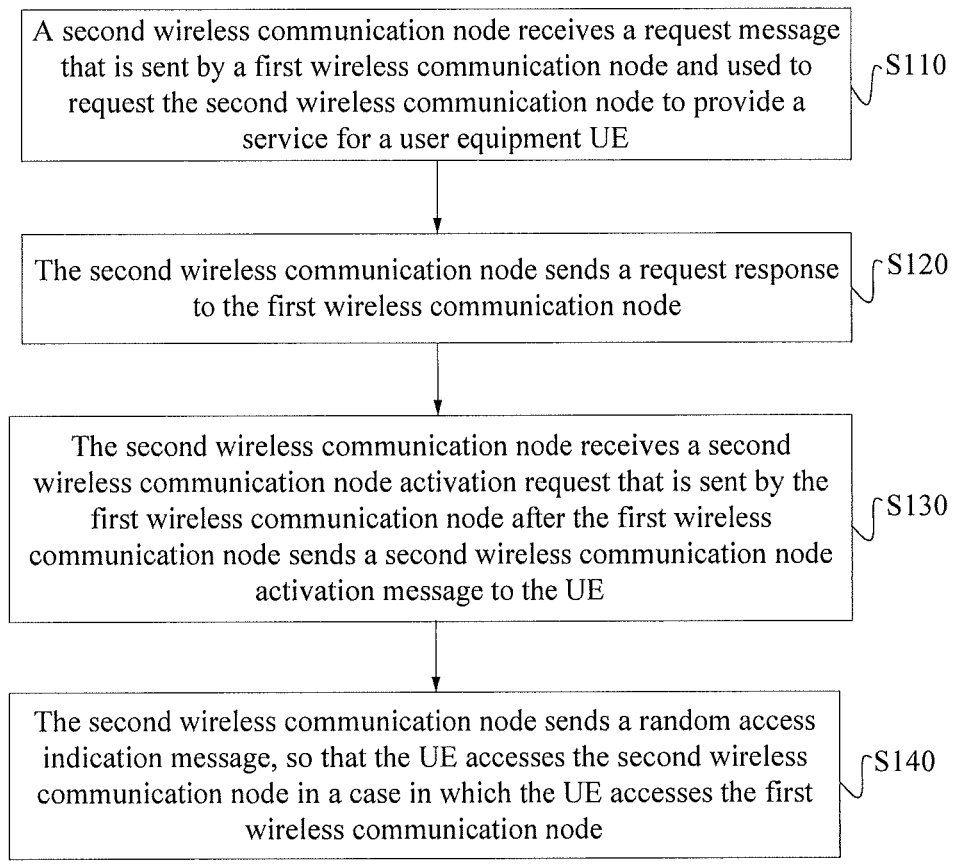
FIG. 1 is a flowchart of Embodiment 1 of a method for accessing a wireless communication node according to the present invention.

FIG. 1 is a flowchart of Embodiment 1 of a method for accessing a wireless communication node according to the present invention. As shown in FIG. 1, a second wireless communication node is used as an executor to describe the method for accessing a wireless communication node in this embodiment, and the method for accessing a wireless communication node provided in this embodiment may include:

S110. The second wireless communication node receives a request message that is sent by a first wireless communication node and used to request the second wireless communication node to provide a service for a user equipment UE.

Both the second wireless communication node and the first wireless communication node may be a wireless communication node, such as a macro base station, a micro base station, a pico base station, a small-cell base station, a home eNodeB, a relay node, a donor eNodeB (DeNB) of a relay node, a low power node, and a small-cell node. The first wireless communication node is a wireless communication node that the UE has already accessed. The second wireless communication node is a wireless communication node that the UE expects to access in a case in which the UE accesses the first wireless communication node; or the second wireless communication node may be a wireless communication node that the first wireless communication node expects the UE to access in a case in which the UE accesses the first wireless communication node. The request message may be a UE context setup request, a bearer setup request, a handover request, a coordinated service request, a secondary cell transmission request, or the like, which, however, is not construed as a limitation. The request message may be transmitted on an interface such as an S1 interface, an X2 interface, or an X3 interface. An X3 interface in this embodiment of the present invention may be any interface between the first wireless communication node and the second wireless communication node, for example, a newly-added interface between a macro base station and a small-cell node.

S120. The second wireless communication node sends a request response to the first wireless communication node. For example, if the second wireless communication node agrees to provide a service for the user equipment UE, the request response carries information that the second wireless communication node agrees to provide a service for the user equipment UE; and if the second wireless communication node does not agree to provide a service for the user equipment UE the request response carries information that the second wireless communication node does not agree to provide a service for the user equipment UE.

S130. The second wireless communication node receives a second wireless communication node activation request that is sent by the first wireless communication node after the first wireless communication node sends a second wireless communication node activation message to the UE. Preferably, S130 is performed in a case in which the request response carries the information that the second wireless communication node agrees to provide a service for the user equipment UE.

The second wireless communication node activation message may be a secondary cell activation message, and the secondary cell activation message may be a small cell activation message, a secondary serving cell activation message, or a coordinated serving cell activation message.

The second wireless communication node activation request may be a secondary cell activation request, a small cell activation request, a secondary serving cell activation request, a coordinated serving cell activation request, or the like.

S140. The second wireless communication node sends a random access indication message, so that the UE accesses the second wireless communication node in a case in which the UE accesses the first wireless communication node.

According to the method for accessing a wireless communication node provided in this embodiment, a second wireless communication node receives a request message that is sent by a first wireless communication node and used for providing a service for a UE, and a second wireless communication node activation request; and sends a random access indication message, so as to provide a service for the UE when the first wireless communication node provides a service for the UE.

Preferably, that the second wireless communication node sends a random access indication message, so that the UE accesses the second wireless communication node in a case in which the UE accesses the first wireless communication node includes that: the second wireless communication node sends, to the UE, a physical downlink control channel (PDCCH) message that includes a random access preamble, so that the UE accesses the second wireless communication node according to the random access preamble in a case in which the UE accesses the first wireless communication node. In other words, the second wireless communication node may send the random access indication message directly to the UE, where the random access indication message may be the PDCCH message, the PDCCH message includes the random access preamble, and the UE may access the second wireless communication node by using the random access preamble.

Optionally, the request message or the second wireless communication node activation request includes a random access preamble that is allocated by the first wireless communication node to the UE and used to access the second wireless communication node; and that the second wireless communication node sends, to the UE, a PDCCH message that includes a random access preamble includes that: the second wireless communication node sends, to the UE, a PDCCH message that includes the random access preamble allocated by the first wireless communication node. In a word, the first wireless communication node may allocate the random access preamble to the UE, where the random access preamble is used to access the second wireless communication node; and send the random access preamble to the second wireless communication node by using the request message or the second wireless communication node activation request, so that the second wireless communication node sends the random access preamble to the corresponding UE.

Preferably, the request message includes a first cell radio network temporary identifier (C-RNTI) used in the first wireless communication node by the UE, or the second wireless communication node activation request includes a first C-RNTI; and before the second wireless communication node sends, to the UE, the PDCCH message that includes the random access preamble, the method further includes that: the second wireless communication node scrambles the PDCCH message by using the first C-RNTI and a first physical cell identifier (PCI) of the first wireless communication node, or the second wireless communication node scrambles the PDCCH message by using the first C-RNTI and a second PCI of the second wireless communication node.

Preferably, after the second wireless communication node sends, to the UE, the PDCCH message that includes the random access preamble, the method further includes that: the second wireless communication node receives a random access request that is sent by the UE and includes the random access preamble. In detail, the request message or the second wireless communication node activation request sent by the first wireless communication node to the second wireless communication node may include the first C-RNTI used in the first wireless communication node by the UE; the second wireless communication node may scramble the PDCCH message that is sent to the first wireless communication node and includes the random access preamble, for example, the second wireless communication node may scramble the PDCCH message by using the first C-RNTI and the first PCI of the first wireless communication node, so as to avoid that multiple UEs receive the PDCCH message in a case in which the first C-RNTI used by the UE has been already used in the second wireless communication node by another UE; certainly, in a case in which the first C-RNTI is not used by another UE in the second wireless communication node, the PDCCH message may be also scrambled by using the first C-RNTI and the second PCI of the second wireless communication node; and after sending, to the UE, the PDCCH message that includes the random access preamble, the second wireless communication node may further receive the random access request that is sent by the UE and includes the random access preamble.

Preferably, before the second wireless communication node scrambles the PDCCH message by using the first C-RNTI and the second PCI of the second wireless communication node, the method further includes that: the second wireless communication node receives a C-RNTI set that is sent by an operation, administration and maintenance (OAM) unit or the first wireless communication node and that is to be allocated by the second wireless communication node to the UE for use, where the C-RNTI set does not include the first C-RNTI. Specifically, the OAM or the first wireless communication node may pre-allocate, to the second wireless communication node, the C-RNTI set that is to be allocated by the second wireless communication node to the UE for use, where the C-RNTI set does not include the first C-RNTI, so as to avoid a case in which the first C-RNTI used in the first wireless communication node by the UE is used in the second wireless communication node by another UE. Afterward, the first wireless communication node may use the second wireless communication node activation request to carry the first C-RNTI and send the second wireless communication node activation request to the second wireless communication node, and the second wireless communication node may use the first C-RNTI and the second PCI of the second wireless communication node to scramble the PDCCH message that is sent to the UE.

Preferably, the request response includes a second C-RNTI that is allocated by the second wireless communication node to the UE, so that the first wireless communication node sends the second C-RNTI to the UE; and before the second wireless communication node sends, to the UE, the PDCCH message that includes the random access preamble, the method further includes that: the second wireless communication node scrambles the PDCCH message by using the second C-RNTI and a second PCI of the second wireless communication node. In detail, after the second wireless communication node receives the request message that is sent by the first wireless communication node and used for providing a service for the user equipment UE, the second wireless communication node may allocate the second C-RNTI to the UE, and use the request response to carry the second C-RNTI and send the request response to the first wireless communication node; and correspondingly, the second wireless communication node may use the second C-RNTI and the second PCI of the second wireless communication node to scramble the PDCCH message that is sent to the UE, where the PDCCH message includes the random access preamble.

Preferably, that the second wireless communication node sends a random access indication message, so that the UE accesses the second wireless communication node in a case in which the UE accesses the first wireless communication node includes that: the second wireless communication node sends, to the first wireless communication node, a second wireless communication node activation response message that includes a random access preamble allocated by the second wireless communication node, so that the first wireless communication node sends, to the UE, a PDCCH message that includes the random access preamble, and then the UE accesses the second wireless communication node according to the random access preamble in a case in which the UE accesses the first wireless communication node. In other words, the second wireless communication node may first send, to the first wireless communication node by using the second wireless communication node activation response message, the random access preamble that is to be allocated to the UE, and then, the first wireless communication node uses the PDCCH message to carry the random access preamble and sends the PDCCH message to the UE.

Preferably, the request response or the second wireless communication node activation response message includes a second C-RNTI that is allocated by the second wireless communication node to the UE, so that the first wireless communication node scrambles the PDCCH message by using the second C-RNTI.

Preferably, the request message includes a first C-RNTI used in the first wireless communication node by the UE, or the second wireless communication node activation request includes a first C-RNTI, and after the second wireless communication node receives the second wireless communication node activation request, the second wireless communication node serves the UE by using the first C-RNTI.

Preferably, after the second wireless communication node sends, to the first wireless communication node, the second wireless communication node activation response message that includes the random access preamble allocated by the second wireless communication node, the method further includes that: the second wireless communication node receives a random access request that is sent by the UE and includes the random access preamble.

Preferably, before the second wireless communication node receives the second wireless communication node activation request sent by the first wireless communication node, the method further includes that: the second wireless communication node receives a C-RNTI set that is sent by an operation, administration and maintenance OAM unit or the first wireless communication node and that is to be allocated by the second wireless communication node to the UE for use, where the C-RNTI set does not include the first C-RNTI. That is, the OAM or the first wireless communication node may pre-allocate, to the second wireless communication node, the C-RNTI set that is to be allocated by the second wireless communication node to the UE for use, where the C-RNTI set does not include the first C-RNTI, so as to avoid a case in which the first C-RNTI used in the first wireless communication node by the UE is used in the second wireless communication node by another UE.

Preferably, after the second wireless communication node receives the random access request that is sent by the UE and includes the random access preamble, the method further includes that: the second wireless communication node sends, to the UE, a random access response that includes a second C-RNTI, where the second C-RNTI is a C-RNTI that is allocated by the second wireless communication node to the UE. If the second wireless communication node has received the random access request that is sent by the UE and includes the random access preamble, the second wireless communication node may reply to the UE with the random access response that includes the second C-RNTI, where the second C-RNTI is different from a C-RNTI used by another UE that has already accessed the second wireless communication node.

Preferably, the request message includes: an application-layer protocol identifier APID that is allocated by the first wireless communication node to the UE, and an identifier of the second wireless communication node, where the identifier of the second wireless communication node includes one or a combination of: an E-UTRAN cell global identifier, the second physical cell identifier PCI, and a frequency of the second wireless communication node that are corresponding to the second wireless communication node. Specifically, when the request message is transmitted on an S1 interface, an X2 interface, or an X3 interface, the APID may be a UE S1AP ID, an eNB UE X2 AP ID, or a UE X3AP ID respectively.

According to the method for accessing a wireless communication node provided in this embodiment, a second wireless communication node receives a request message that is sent by a first wireless communication node and used for providing a service for a UE, and a second wireless communication node activation request, and sends a random access indication message, so as to provide a service for the UE when the first wireless communication node provides a service for the UE. In addition, a PDCCH message is scrambled in different scrambling manners, so that the UE can correctly detect the PDCCH message and further accesses the second wireless communication node.

Figure 2:
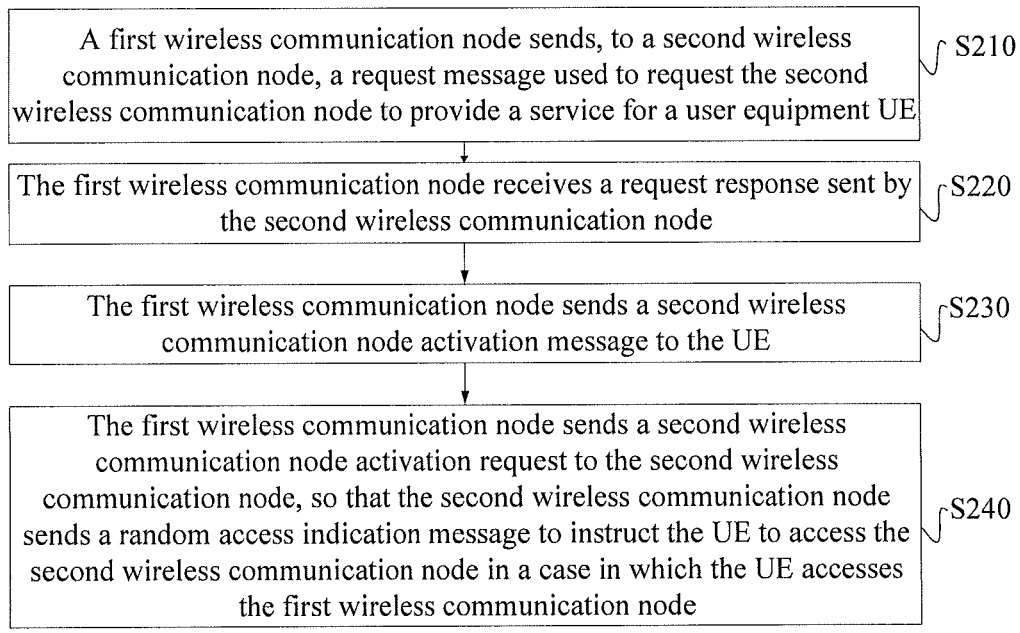
FIG. 2 is a flowchart of Embodiment 2 of a method for accessing a wireless communication node according to the present invention.

FIG. 2 is a flowchart of Embodiment 2 of a method for accessing a wireless communication node according to the present invention. As shown in FIG. 2, a first wireless communication node is used as an executor to describe the method for accessing a wireless communication node in this embodiment, and the method for accessing a wireless communication node provided in this embodiment may include:

S210. The first wireless communication node sends, to a second wireless communication node, a request message used to request the second wireless communication node to provide a service for a user equipment UE.

Both the first wireless communication node and the second wireless communication node may be a wireless communication node, such as a macro base station, a micro base station, a pico base station, a small-cell base station, a home eNodeB, a relay node, a donor eNodeB of a relay node, a low power node, and a small-cell node. The first wireless communication node is a wireless communication node that the UE has already accessed. The second wireless communication node is a wireless communication node that the UE expects to access in a case in which the UE accesses the first wireless communication node; or the second wireless communication node may be a wireless communication node that the first wireless communication node expects the UE to access in a case in which the UE accesses the first wireless communication node. The request message may be a UE context setup request, a bearer setup request, a handover request, a coordinated service request, a secondary cell transmission request, or the like, which, however, is not construed as a limitation. The request message may be transmitted on an interface such as an S1 interface, an X2 interface, or an X3 interface. An X3 interface in this embodiment of the present invention may be any interface between the first wireless communication node and the second wireless communication node, for example, a newly-added interface between a macro base station and a small-cell node.

S220. The first wireless communication node receives a request response sent by the second wireless communication node. For example, if the second wireless communication node agrees to provide a service for the user equipment UE, the request response carries information that the second wireless communication node agrees to provide a service for the user equipment UE; and if the second wireless communication node does not agree to provide a service for the user equipment UE, the request response carries information that the second wireless communication node does not agree to provide a service for the user equipment UE.

S230. The first wireless communication node sends a second wireless communication node activation message to the UE. Preferably, S230 is performed in a case in which the request response carries the information that the second wireless communication node agrees to provide a service for the user equipment UE.

The second wireless communication node activation message may be a secondary cell activation message, and the secondary cell activation message may be a small cell activation message, a secondary serving cell activation message, or a coordinated serving cell activation message.

S240. The first wireless communication node sends a second wireless communication node activation request to the second wireless communication node, so that the second wireless communication node sends a random access indication message to instruct the UE to access the second wireless communication node in a case in which the UE accesses the first wireless communication node.

The second wireless communication node activation request may be a secondary cell activation request, a small cell activation request, a secondary serving cell activation request, a coordinated serving cell activation request, or the like.

According to the method for accessing a wireless communication node provided in this embodiment, a first wireless communication node sends, to a second wireless communication node, a request message that is used for providing a service for a UE, and a second wireless communication node activation request, so that the second wireless communication node can provide a service for the UE when the first wireless communication node provides a service for the UE.

Preferably, that the first wireless communication node sends a second wireless communication node activation request to the second wireless communication node, so that the second wireless communication node sends a random access indication message to instruct the UE to access the second wireless communication node in a case in which the UE accesses the first wireless communication node includes that: the first wireless communication node sends the second wireless communication node activation request to the second wireless communication node, so that the second wireless communication node sends, to the UE, a physical downlink control channel PDCCH message that includes a random access preamble, so as to instruct the UE to access the second wireless communication node according to the random access preamble in a case in which the UE accesses the first wireless communication node. In other words, after the first wireless communication node sends the second wireless communication node activation request to the second wireless communication node, the second wireless communication node may send the random access indication message directly to the UE, where the random access indication message may be the PDCCH message, the PDCCH message includes the random access preamble, and the UE may access the second wireless communication node by using the random access preamble.

Preferably, the request message or the second wireless communication node activation request includes a random access preamble that is allocated by the first wireless communication node to the UE and used to access the second wireless communication node; and that the first wireless communication node sends the second wireless communication node activation request to the second wireless communication node, so that the second wireless communication node sends, to the UE, a PDCCH message that includes a random access preamble, so as to instruct the UE to access the second wireless communication node according to the random access preamble includes that: the first wireless communication node sends the second wireless communication node activation request to the second wireless communication node, so that the second wireless communication node sends, to the UE, a PDCCH message that includes the random access preamble allocated by the first wireless communication node, so as to instruct the UE to access the second wireless communication node according to the random access preamble allocated by the first wireless communication node. In a word, the first wireless communication node may allocate the random access preamble to the UE, where the random access preamble is used to access the second wireless communication node; and send the random access preamble to the second wireless communication node by using the request message or the second wireless communication node activation request, so that the second wireless communication node sends the random access preamble to the corresponding UE.

Preferably, the request message includes a first cell radio network temporary identifier C-RNTI used in the first wireless communication node by the UE, or the second wireless communication node activation request includes a first C-RNTI, so that before sending, to the UE, the PDCCH message that includes the random access preamble, the second wireless communication node scrambles the PDCCH message by using the first C-RNTI and a physical cell identifier PCI of the first wireless communication node, or scrambles the PDCCH message by using the first C-RNTI and a second PCI of the second wireless communication node.

Preferably, the first wireless communication node sends the second wireless communication node activation request to the second wireless communication node, so that after sending, to the UE, the PDCCH message that includes the random access preamble, the second wireless communication node receives a random access request that is sent by the UE and includes the random access preamble.

In detail, the request message or the second wireless communication node activation request sent by the first wireless communication node to the second wireless communication node may include the first C-RNTI used in the first wireless communication node by the UE; the second wireless communication node may scramble the PDCCH message that is sent to the first wireless communication node and includes the random access preamble, and the second wireless communication node may scramble the PDCCH message by using the first C-RNTI and a first PCI of the first wireless communication node, so as to avoid in a case in which the first C-RNTI of the UE has been already used in the second wireless communication node by another UE; certainly, in a case in which the first C-RNTI is not used by another UE in the second wireless communication node, the PDCCH message may be also scrambled by using the first C-RNTI and the second PCI of the second wireless communication node; and after sending, to the UE, the PDCCH message that includes the random access preamble, the second wireless communication node may further receive the random access request that is sent by the UE and includes the random access preamble.

Preferably, the request message includes the first C-RNTI used in the first wireless communication node by the UE, or the second wireless communication node activation request includes the first C-RNTI, so that before sending, to the UE, the PDCCH message that includes the random access preamble, the second wireless communication node scrambles the PDCCH message by using the first C-RNTI and the second PCI of the second wireless communication node; and before this, the method further includes that: the first wireless communication node sends, to the second wireless communication node, a C-RNTI set that is to be allocated by the second wireless communication node to the UE for use, where the C-RNTI set does not include the first C-RNTI. Specifically, the first wireless communication node may send, to the second wireless communication node in advance, the C-RNTI set that is to be allocated by the second wireless communication node to a UE for use, where the UE is served by the second wireless communication node, and the C-RNTI set does not include the first C-RNTI, so as to avoid a case in which the first C-RNTI used in the first wireless communication node by the UE is used in the second wireless communication node by another UE. Afterward, the first wireless communication node may use the second wireless communication node activation request to carry the first C-RNTI and send the second wireless communication node activation request to the second wireless communication node, and the second wireless communication node may use the first C-RNTI and the second PCI of the second wireless communication node to scramble the PDCCH message that is sent to the UE.

Preferably, the request response includes a second C-RNTI that is allocated by the second wireless communication node to the UE, and the first wireless communication node sends the second C-RNTI to the UE. In detail, after the second wireless communication node receives the request message that is sent by the first wireless communication node and used for providing a service for the user equipment UE, the second wireless communication node may allocate the second C-RNTI to the UE, and use the request response to carry the second C-RNTI and send the request response to the first wireless communication node; and correspondingly, the second wireless communication node may use the second C-RNTI and the second PCI of the second wireless communication node to scramble the PDCCH message that is sent to the UE, where the PDCCH message includes the random access preamble.

Preferably, after the first wireless communication node sends the second wireless communication node activation request to the second wireless communication node, the method further includes that: the first wireless communication node receives a second wireless communication node activation response message that is sent by the second wireless communication node and includes a random access preamble allocated by the second wireless communication node; the first wireless communication node sends, to the UE, a PDCCH message that includes the random access preamble, so that the UE accesses the second wireless communication node according to the random access preamble in a case in which the UE accesses the first wireless communication node. In other words, after the first wireless communication node sends the second wireless communication node activation request to the second wireless communication node, the second wireless communication node may first send, to the first wireless communication node by using the second wireless communication node activation response message, the random access preamble that is to be allocated to the UE, and then, the first wireless communication node uses the PDCCH message to carry the random access preamble and sends the PDCCH message to the UE.

Preferably, the request response or the second wireless communication node activation response message includes a second C-RNTI that is allocated by the second wireless communication node to the UE; and before the first wireless communication node sends, to the UE, the PDCCH message that includes the random access preamble, the method further includes that: the first wireless communication node scrambles the PDCCH message by using the second C-RNTI and a first physical cell identifier PCI of the first wireless communication node.

Preferably, before the first wireless communication node sends, to the UE, the PDCCH message that includes the random access preamble, the method further includes that: the first wireless communication node scrambles the PDCCH message by using a first C-RNTI and a first physical cell identifier PCI of the first wireless communication node, where the first C-RNTI is a C-RNTI used in the first wireless communication node by the UE.

Preferably, the request message includes the first C-RNTI used in the first wireless communication node by the UE, or the second wireless communication node activation request includes a first C-RNTI, so that the second wireless communication node serves the UE by using the first C-RNTI. That the first wireless communication node sends, to the UE, a PDCCH message that includes the random access preamble, so that the UE accesses the second wireless communication node according to the random access preamble includes that: the first wireless communication node sends, to the UE, the PDCCH message that includes the random access preamble, so that the UE sends, to the second wireless communication node, a random access request that includes the random access preamble.

Preferably, before the first wireless communication node sends the second wireless communication node activation request to the second wireless communication node, the method further includes that: the first wireless communication node sends, to the second wireless communication node, a C-RNTI set that is to be allocated by the second wireless communication node to a UE for use, where the UE is served by the second wireless communication node, and the C-RNTI set does not include the first C-RNTI. That is, the first wireless communication node may send, to the second wireless communication node in advance, the C-RNTI set that is to be allocated by the second wireless communication node to the UE for use, where the C-RNTI set does not include the first C-RNTI, so as to avoid a case in which the first C-RNTI used in the first wireless communication node by the UE is used in the second wireless communication node by another UE.

Preferably, the request message includes: a UE context setup request, a bearer setup request, a handover request, a coordinated service request, or a secondary cell transmission request.

Preferably, the request message includes: an application-layer protocol identifier APID that is allocated by the first wireless communication node to the UE, and an identifier of the second wireless communication node, where the identifier of the second wireless communication node includes one or a combination of: an E-UTRAN cell global identifier, the second physical cell identifier PCI, and a frequency of the second wireless communication node that are corresponding to the second wireless communication node. Specifically, when the request message is transmitted on an S1 interface, an X2 interface, or an X3 interface, the APID may be a UE S1AP ID, an eNB UE X2 AP ID, or a UE X3AP ID respectively.

According to the method for accessing a wireless communication node provided in this embodiment, a first wireless communication node sends, to a second wireless communication node, a request message that is used for providing a service for a UE, and a second wireless communication node activation request, so that the second wireless communication node can provide a service for the UE when the first wireless communication node provides a service for the UE. In addition, a PDCCH message is scrambled in different scrambling manners, so that the UE can correctly detect the PDCCH message and further accesses the second wireless communication node.

Figure 3:
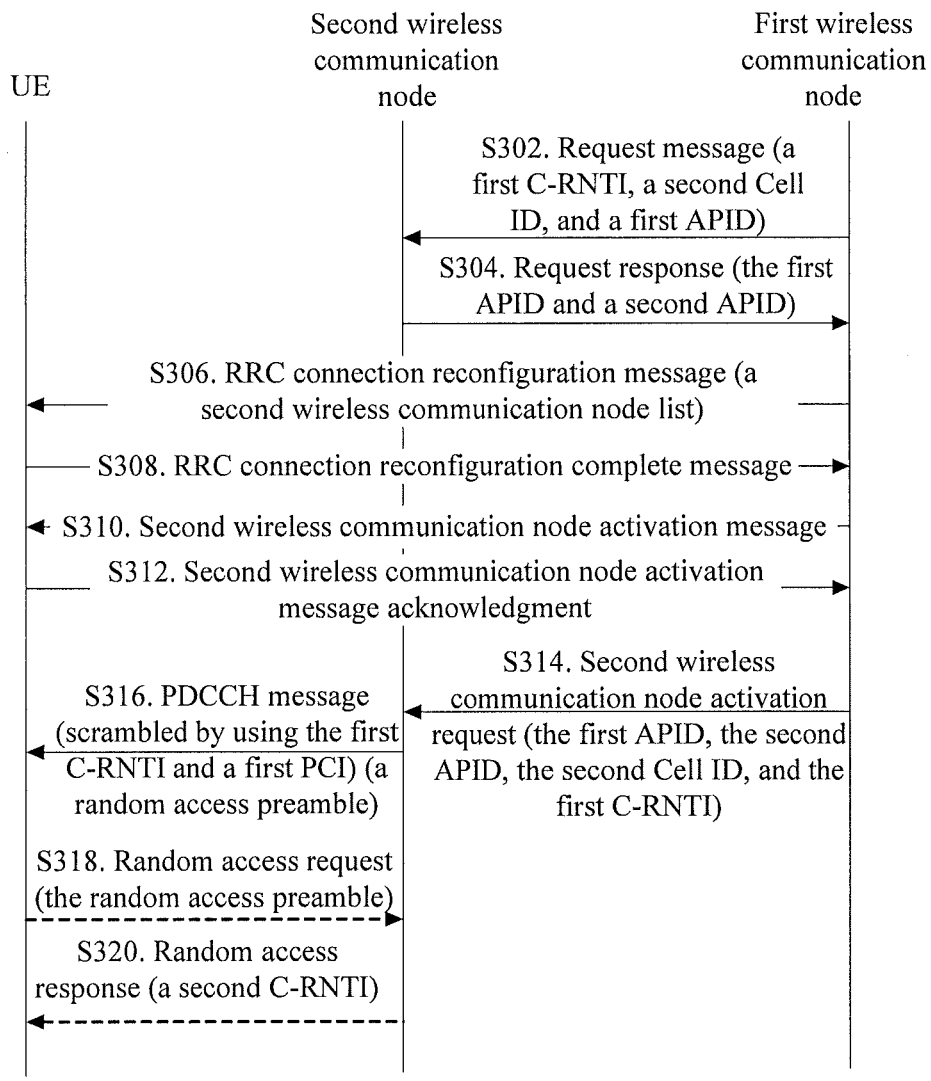
FIG. 3 is a signaling flowchart of Embodiment 3 of a method for accessing a wireless communication node according to the present invention.

FIG. 3 is a signaling flowchart of Embodiment 3 of a method for accessing a wireless communication node according to the present invention. As shown in FIG. 3, the method for accessing a wireless communication node is described by means of signaling interaction among a first wireless communication node, a second wireless communication node, and a UE in this embodiment, and the method for accessing a wireless communication node provided in this embodiment may include:

S302. The first wireless communication node sends a request message to the second wireless communication node.

Both the first wireless communication node and the second wireless communication node may be a wireless communication node, such as a macro base station, a micro base station, a pico base station, a small-cell base station, a home eNodeB, a relay node, a donor eNodeB (DeNB) of a relay node, a low power node, and a small-cell node. The first wireless communication node is a wireless communication node that the UE has already accessed. The second wireless communication node is a wireless communication node that the UE expects to access in a case in which the UE accesses the first wireless communication node; or the second wireless communication node may be a wireless communication node that the first wireless communication node expects the UE to access in a case in which the UE accesses the first wireless communication node. The request message may be a UE context setup request, a bearer setup request, a handover request, a coordinated service request, or a secondary cell transmission request, which, however, is not construed as a limitation. The request message may be transmitted on an interface such as an S1 interface, an X2 interface, or an X3 interface. An X3 interface in this embodiment of the present invention may be any interface between the first wireless communication node and the second wireless communication node, for example, a newly-added interface between a macro base station and a small-cell node.

The request message may carry a first C-RNTI used in the first wireless communication node by the UE, a second Cell ID of the second wireless communication node, and a first APID that is allocated by the first wireless communication node to the UE. The second Cell ID may be one or a combination of: an E-UTRAN cell global identifier (ECGI), a second physical cell identifier PCI, and a frequency of the second wireless communication node that are corresponding to the second wireless communication node; and at an S1AP, X2AP, or X3AP protocol layer, the first APID may be an eNB UE S1AP ID, an Old eNB UE X2AP ID, a New eNB UE X2AP ID, or a UE X3AP ID respectively.

In the request message, a preset value may be filled in a location corresponding to a second APID that is allocated by the second wireless communication node to the UE.

S304. The second wireless communication node sends a request response to the first wireless communication node.

For example, if the second wireless communication node agrees to provide a service for the user equipment UE, the request response carries information that the second wireless communication node agrees to provide a service for the user equipment UE; and if the second wireless communication node does not agree to provide a service for the user equipment UE, the request response carries information that the second wireless communication node does not agree to provide a service for the user equipment UE. The request response may include the first APID that is allocated by the first wireless communication node to the UE, and the second APID that is allocated by the second wireless communication node to the UE.

S306. The first wireless communication node sends a second wireless communication node list to the UE, where the first wireless communication node may use a radio resource control (RRC) protocol connection reconfiguration message to carry the second wireless communication node list and send the radio resource control protocol connection reconfiguration message to the UE.

This step may also be performed before step S302.

S308. After receiving the RRC connection reconfiguration message that is sent by the first wireless communication node and carries the second wireless communication node list, the UE may send an RRC connection reconfiguration complete message to the first wireless communication node.

S310. The first wireless communication node sends a second wireless communication node activation message to the UE.

The second wireless communication node activation message may be Media Access Control (MAC) layer signaling, or an RRC reconfiguration message. The second wireless communication node activation message may be a secondary cell activation message, and the secondary cell activation message may be a small cell activation message, a secondary serving cell activation message, or a coordinated serving cell activation message.

S312. After receiving the second wireless communication node activation message sent by the first wireless communication node, the UE replies to the first wireless communication node with a second wireless communication node activation message acknowledgment.

S314. The first wireless communication node sends a second wireless communication node activation request to the second wireless communication node.

The second wireless communication node activation request may be a secondary cell activation request, a small cell activation request, a secondary serving cell activation request, a coordinated serving cell activation request, or the like.

The second wireless communication node activation request may carry the first APID, the second APID, and the second Cell ID. If in step S302, the request message that is sent by the first wireless communication node to the second wireless communication node does not carry the first C-RNTI, the first wireless communication node may use the second wireless communication node activation request to carry the first C-RNTI and send the second wireless communication node activation request to the second wireless communication node in this step.

After receiving the second wireless communication node activation request, the second wireless communication node may return a second wireless communication node activation response message to the first wireless communication node. The second wireless communication node activation request and the second wireless communication node activation response message may also be transmitted through an interface such as an S1 interface, an X2 interface, or an X3 interface.

S316. The second wireless communication node sends a PDCCH message to the UE.

The PDCCH message is, for example, a PDCCH order, and the PDCCH message carries a random access preamble. The second wireless communication node may scramble the PDCCH message by using the first C-RNTI and a first PCI, so as to avoid that the UE cannot correctly identify the PDCCH message in a case in which the first C-RNTI used in the first wireless communication node by the UE is used in the second wireless communication node by another UE.

S318. The UE sends a random access request to the second wireless communication node.

After receiving the PDCCH message sent by the second wireless communication node, the UE decodes the PDCCH message to acquire the random access preamble carried in the PDCCH message, and uses the random access request to carry the random access preamble and sends the random access request to the second wireless communication node.

S320. The second wireless communication node sends a random access response to the UE.

If the second wireless communication node determines that another UE that has already accessed the second wireless communication node and the UE to which the random access response is sent use a same first C-RNTI, the second wireless communication node sends, to the UE by using the random access response, a second C-RNTI that is different from the C-RNTI used by the another UE that has already accessed the second wireless communication node; or no matter whether a C-RNTI used by another UE that has already accessed the second wireless communication node and a first C-RNTI of the UE to which the random access response is sent are repetitive, the second wireless communication node directly sends, to the UE by using the random access response, a second C-RNTI that is different from the C-RNTI used by the another UE that has already accessed the second wireless communication node.

In this embodiment, another PDCCH message, such as arrival of downlink data, or scheduling information, may be used as the PDCCH message in step S316 in a case in which the first wireless communication node is synchronized with the second wireless communication node. In this way, steps S318 and S320 may be omitted.

According to the method for accessing a wireless communication node provided in this embodiment, communication among a first wireless communication node that a UE has already accessed, a second wireless communication node that the UE expects to access, and the UE enables the first wireless communication node and the second wireless communication node to provide a service for the UE at the same time. In addition, a PDCCH message is scrambled in different scrambling manners, so that the UE can correctly detect the PDCCH message and further accesses the second wireless communication node.

Figure 4:
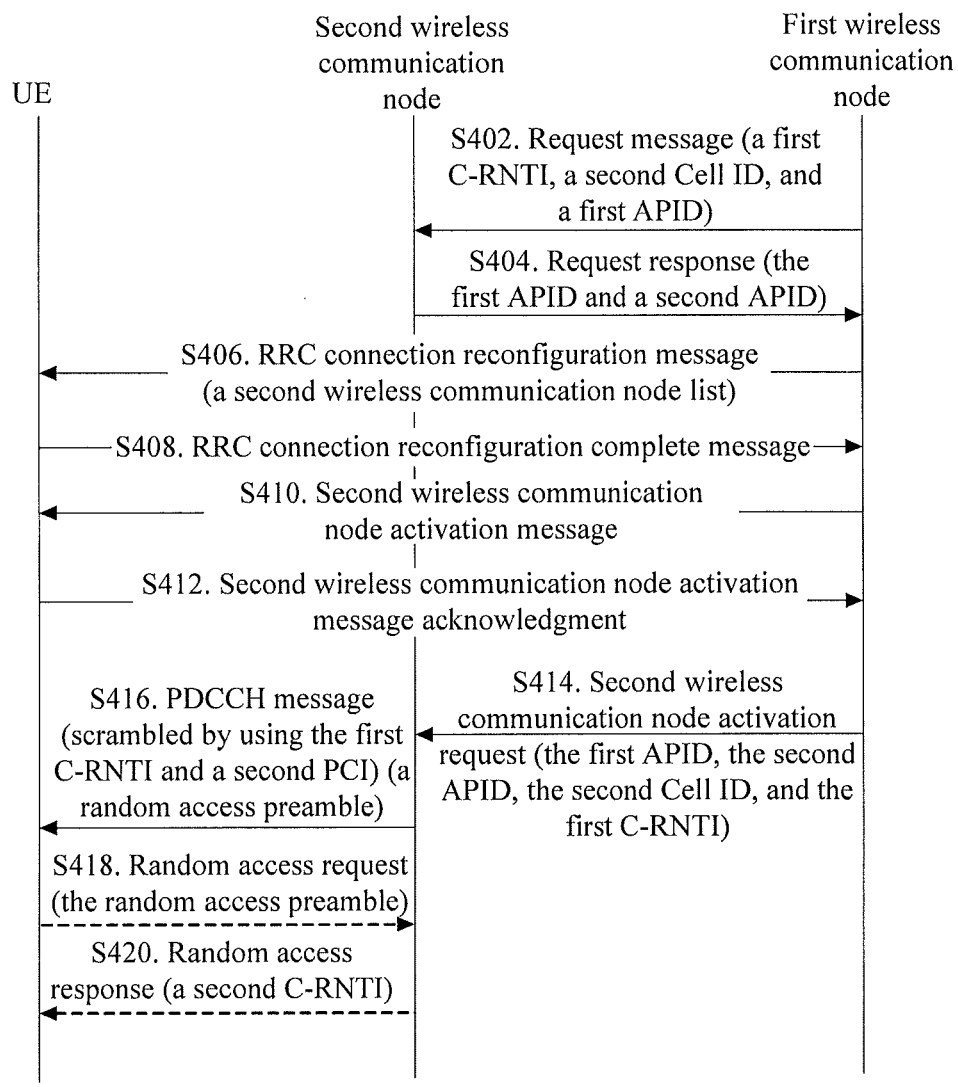
FIG. 4 is a signaling flowchart of Embodiment 4 of a method for accessing a wireless communication node according to the present invention.

FIG. 4 is a signaling flowchart of Embodiment 4 of a method for accessing a wireless communication node according to the present invention. As shown in FIG. 4, the method for accessing a wireless communication node is described by means of signaling interaction among a first wireless communication node, a second wireless communication node, and a UE in this embodiment, and a difference between this embodiment and the embodiment shown in FIG. 3 lies in that this embodiment is applicable to a case in which a first C-RNTI is not used by another UE in the second wireless communication node.

The method for accessing a wireless communication node provided in this embodiment may include:

Steps S402-S414 and S418-S420 are respectively the same as steps S302-S314 and S318-S320 in the embodiment shown in FIG. 3.

S416. The second wireless communication node sends a PDCCH message to the UE.

The PDCCH message is, for example, a PDCCH order, and the PDCCH message carries a random access preamble. The second wireless communication node may scramble the PDCCH message by using a first C-RNTI and a second PCI.

According to the method for accessing a wireless communication node provided in this embodiment, communication among a first wireless communication node that a UE has already accessed, a second wireless communication node that the UE expects to access, and the UE enables the first wireless communication node and the second wireless communication node to provide a service for the UE at the same time.

Figure 5:
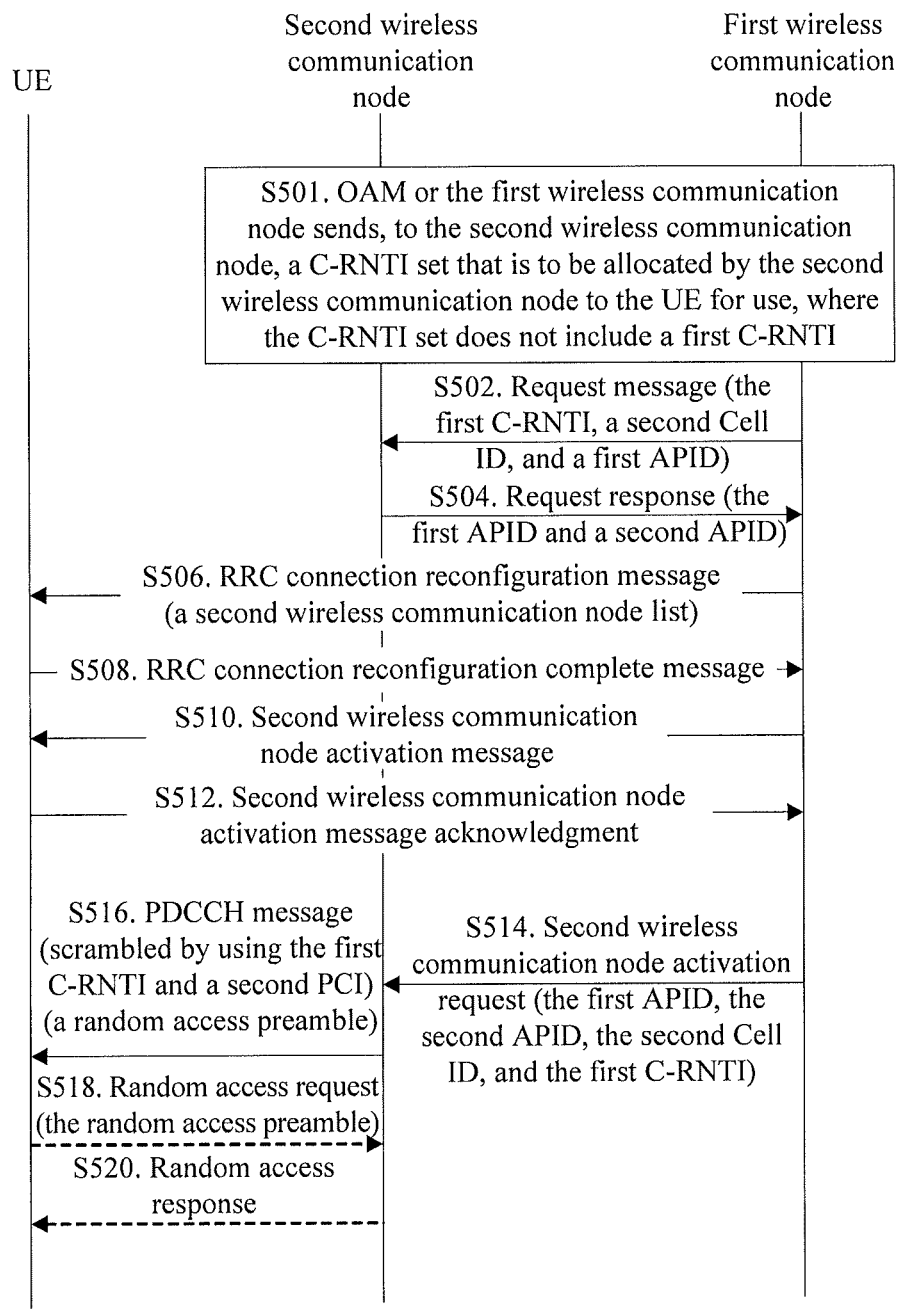
FIG. 5 is a signaling flowchart of Embodiment 5 of a method for accessing a wireless communication node according to the present invention.

FIG. 5 is a signaling flowchart of Embodiment 5 of a method for accessing a wireless communication node according to the present invention. As shown in FIG. 5, the method for accessing a wireless communication node is described by means of signaling interaction among a first wireless communication node, a second wireless communication node, and a UE in this embodiment, and a difference between this embodiment and the embodiment shown in FIG. 4 lies in that, in this embodiment, a C-RNTI set that is to be allocated by the second wireless communication node to a UE for use is sent to the second wireless communication node in advance, where the UE is served by the second wireless communication node.

The method for accessing a wireless communication node provided in this embodiment may include:

S501. OAM or the first wireless communication node sends, to the second wireless communication node, the C-RNTI set that is to be allocated by the second wireless communication node to the UE for use, where the C-RNTI set does not include a first C-RNTI.

It may be that the OAM or the first wireless communication node pre-allocates a C-RNTI set, for example, a C-RNTI interval or a C-RNTI list to the second wireless communication node; the second wireless communication node allocates a C-RNTI in the C-RNTI set to the UE, and the C-RNTI is used as a second C-RNTI of a UE that accesses the second wireless communication node. However, the first wireless communication node does not use a C-RNTI in the C-RNTI set as a first C-RNTI of a UE that accesses the first wireless communication node, thereby avoiding a case in which a C-RNTI used by the UE that accesses the second wireless communication node is repetitive.

S502-S518 are respectively the same as S402-S418 in FIG. 4.

S520. The second wireless communication node sends a random access response to the UE.

The second wireless communication node neither needs to determine whether a first C-RNTI of the UE and a C-RNTI used by another UE that has already accessed the second wireless communication node are repetitive, nor needs to allocate a second C-RNTI again.

According to the method for accessing a wireless communication node of a base station provided in this embodiment, communication among a first wireless communication node that a UE has already accessed, a second wireless communication node that the UE expects to access, and the UE enables the first wireless communication node and the second wireless communication node to provide a service for the UE at the same time. In addition, a second C-RNTI to be used by the UE is pre-allocated to the second wireless communication node, thereby avoiding a case in which the UE uses a same C-RNTI in the first wireless communication node and the second wireless communication node, so that the UE can correctly detect a PDCCH message and further accesses the second wireless communication node.

Figure 6:
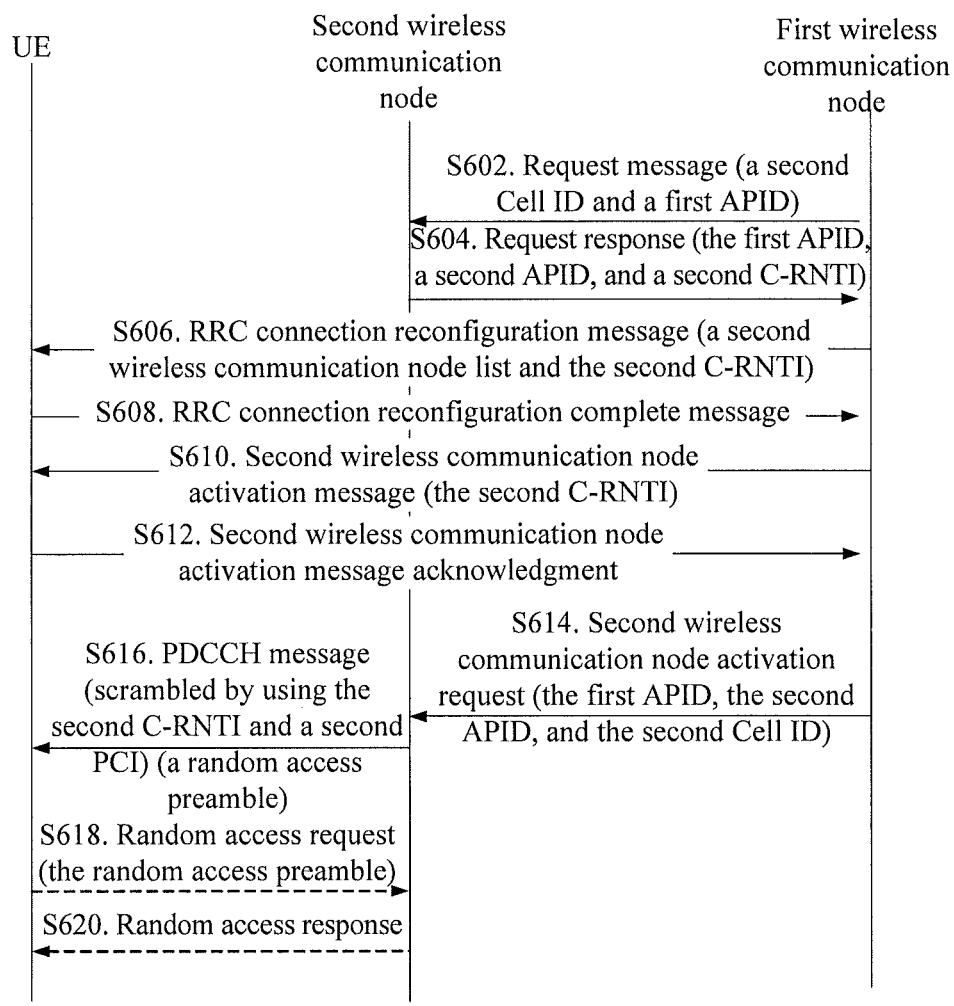
FIG. 6 is a signaling flowchart of Embodiment 6 of a method for accessing a wireless communication node according to the present invention.

FIG. 6 is a signaling flowchart of Embodiment 6 of a method for accessing a wireless communication node according to the present invention. As shown in FIG. 6, the method for accessing a wireless communication node is described by means of signaling interaction among a first wireless communication node, a second wireless communication node, and a UE in this embodiment, and a difference between this embodiment and the embodiment shown in FIG. 3 lies in that, in this embodiment, the second wireless communication node first reports, to the first wireless communication node, a second C-RNTI that is allocated to a UE, and the second C-RNTI is sent by the first wireless communication node to a UE that expects to access the second wireless communication node.

The method for accessing a wireless communication node provided in this embodiment may include:

S602. The first wireless communication node sends a request message to the second wireless communication node.

Both the first wireless communication node and the second wireless communication node may be a wireless communication node, such as a macro base station, a micro base station, a pico base station, a small-cell base station, a home eNodeB, a relay node, a donor eNodeB (DeNB) of a relay node, a low power node, and a small-cell node. The first wireless communication node is a wireless communication node that the UE has already accessed. The second wireless communication node is a wireless communication node that the UE expects to access in a case in which the UE accesses the first wireless communication node; or the second wireless communication node may be a wireless communication node that the first wireless communication node expects the UE to access in a case in which the UE accesses the first wireless communication node. The request message may be a UE context setup request, a bearer setup request, a handover request, a coordinated service request, or a secondary cell transmission request, which, however, is not construed as a limitation. The request message may be transmitted on an interface such as an S1 interface, an X2 interface, or an X3 interface. An X3 interface in this embodiment of the present invention may be any interface between the first wireless communication node and the second wireless communication node, for example, a newly-added interface between a macro base station and a small-cell node.

The request message may carry a second Cell ID of the second wireless communication node and a first APID that is allocated by the first wireless communication node to the UE. The second Cell ID may be one or a combination of: an E-UTRAN cell global identifier (ECGI), a second physical cell identifier PCI, and a frequency of the second wireless communication node that are corresponding to the second wireless communication node; and at an S1AP, X2AP, or X3AP protocol layer, the first APID may be an eNB UE S1AP ID, an Old eNB UE X2AP ID, a New eNB UE X2AP ID, or a UE X3AP ID respectively.

In the request message, a preset value may be filled in a location corresponding to a second APID that is allocated by the second wireless communication node to the UE.

S604. The second wireless communication node sends a request response to the first wireless communication node.

For example, if the second wireless communication node agrees to provide a service for the user equipment UE, the request response carries information that the second wireless communication node agrees to provide a service for the user equipment UE; and if the second wireless communication node does not agree to provide a service for the user equipment UE, the request response carries information that the second wireless communication node does not agree to provide a service for the user equipment UE. The request response may include the first APID that is allocated by the first wireless communication node to the UE, and the second APID that is allocated by the second wireless communication node to the UE. In addition, the request response includes the second C-RNTI that is allocated by the second wireless communication node to the UE.

S606. The first wireless communication node sends a second wireless communication node list and the second C-RNTI to the UE, where the first wireless communication node may use an RRC connection reconfiguration message to carry the second wireless communication node list and the second C-RNTI and send the RRC connection reconfiguration message to the second wireless communication node.

S608. After receiving the RRC connection reconfiguration message that is sent by the first wireless communication node and carries the second wireless communication node list and the second C-RNTI, the UE may send an RRC connection reconfiguration complete message to the first wireless communication node.

S610. The first wireless communication node sends a second wireless communication node activation message to the UE.

The second wireless communication node activation message may be MAC layer signaling or an RRC reconfiguration message. The second wireless communication node activation message may be a secondary cell activation message, and the secondary cell activation message may be a small cell activation message, a secondary serving cell activation message, or a coordinated serving cell activation message. If in step S606, the first wireless communication node does not send the second C-RNTI to the UE, the first wireless communication node may use the second wireless communication node activation message to carry the second C-RNTI and send the second wireless communication node activation message to the UE in this step.

S612. After receiving the second wireless communication node activation message sent by the first wireless communication node, the UE replies to the first wireless communication node with a second wireless communication node activation message acknowledgment.

S614. The first wireless communication node sends a second wireless communication node activation request to the second wireless communication node.

The second wireless communication node activation request may be a secondary cell activation request, a small cell activation request, a secondary serving cell activation request, a coordinated serving cell activation request, or the like.

The second wireless communication node activation request may carry the first APID, the second APID, and the second Cell ID.

After receiving the second wireless communication node activation request, the second wireless communication node may return a second wireless communication node activation response message to the first wireless communication node. The second wireless communication node activation request and the second wireless communication node activation response message may also be transmitted through an interface such as an S1 interface, an X2 interface, or an X3 interface.

S616. The second wireless communication node sends a PDCCH message to the UE.

The PDCCH message is, for example, a PDCCH order, and the PDCCH message carries a random access preamble. The second wireless communication node may scramble the PDCCH message by using the second C-RNTI and a second PCI.

S618. The UE sends a random access request to the second wireless communication node.

After receiving the PDCCH message sent by the second wireless communication node, the UE decodes the PDCCH message to acquire the random access preamble carried in the PDCCH message, and uses the random access request to carry the random access preamble and sends the random access request to the second wireless communication node.

S620. The second wireless communication node sends a random access response to the UE.

The second wireless communication node neither needs to determine whether a first C-RNTI of the UE and a C-RNTI used by another UE that has already accessed the second wireless communication node are repetitive, nor needs to allocate a second C-RNTI again.

According to the method for accessing a wireless communication node of a base station provided in this embodiment, communication among a first wireless communication node that a UE has already accessed, a second wireless communication node that the UE expects to access, and the UE enables the first wireless communication node and the second wireless communication node to provide a service for the UE at the same time. In addition, the second wireless communication node pre-allocates a second C-RNTI to the UE, thereby avoiding a case in which the UE uses a same C-RNTI in the first wireless communication node and the second wireless communication node, so that the UE can correctly detect a PDCCH message and further accesses the second wireless communication node.

Figure 7:
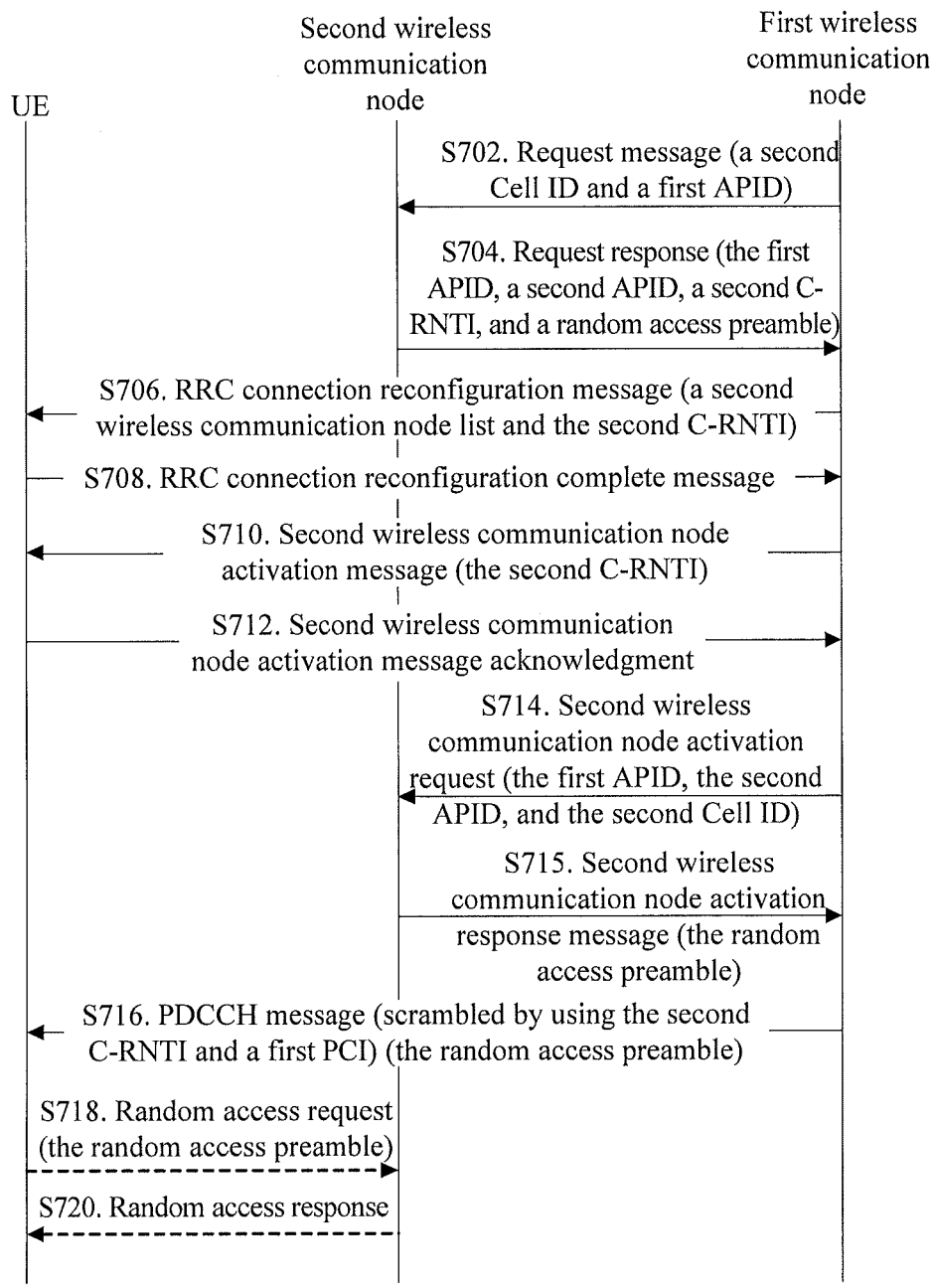
FIG. 7 is a signaling flowchart of Embodiment 7 of a method for accessing a wireless communication node according to the present invention.

FIG. 7 is a signaling flowchart of Embodiment 7 of a method for accessing a wireless communication node according to the present invention. As shown in FIG. 7, the method for accessing a wireless communication node is described by means of signaling interaction among a first wireless communication node, a second wireless communication node, and a UE in this embodiment, and a difference between this embodiment and the embodiment shown in FIG. 6 lies in that, in this embodiment, the second wireless communication node sends a random access preamble to the UE through the first wireless communication node.

The method for accessing a wireless communication node provided in this embodiment may include:

S702 is the same as S602 in the embodiment shown in FIG. 6.

S704. The second wireless communication node sends a request response to the first wireless communication node.

The request response may include a first APID that is allocated by the first wireless communication node to the UE, and a second APID that is allocated by the second wireless communication node to the UE. In addition, the request response includes a second C-RNTI that is allocated by the second wireless communication node to the UE, and the random access preamble.

S706-S714 are respectively the same as S606-S614 in the embodiment shown in FIG. 6.

S715. The second wireless communication node sends a second wireless communication node activation response message to the first wireless communication node.

If in step S704, the second wireless communication node does not use the request response to carry the random access preamble, the second wireless communication node may use the second wireless communication node activation response message to carry the random access preamble and send the second wireless communication node activation response message to the first wireless communication node in this step.

S716. The first wireless communication node sends a PDCCH message to the UE.

The PDCCH message is, for example, a PDCCH order, and the PDCCH message carries the random access preamble. The first wireless communication node may scramble the PDCCH message by using the second C-RNTI and a first PCI.

S718 and S720 are respectively the same as S618 and S620 in the embodiment shown in FIG. 6.

In addition, the random access preamble that is to be used by the UE to access the second wireless communication node may also be allocated by the first wireless communication node, and the first wireless communication node may send the random access preamble to the second wireless communication node by performing S702 or S714, so that the second wireless communication node learns that the UE will use the random access preamble when the UE initiates access.

According to the method for accessing a wireless communication node of a base station provided in this embodiment, communication among a first wireless communication node that a UE has already accessed, a second wireless communication node that the UE expects to access, and the UE enables the first wireless communication node and the second wireless communication node to provide a service for the UE at the same time. In addition, the second wireless communication node pre-allocates a second C-RNTI to the UE, thereby avoiding a case in which the UE uses a same C-RNTI in the first wireless communication node and the second wireless communication node, so that the UE can correctly detect a PDCCH message and further accesses the second wireless communication node.

Figure 8:
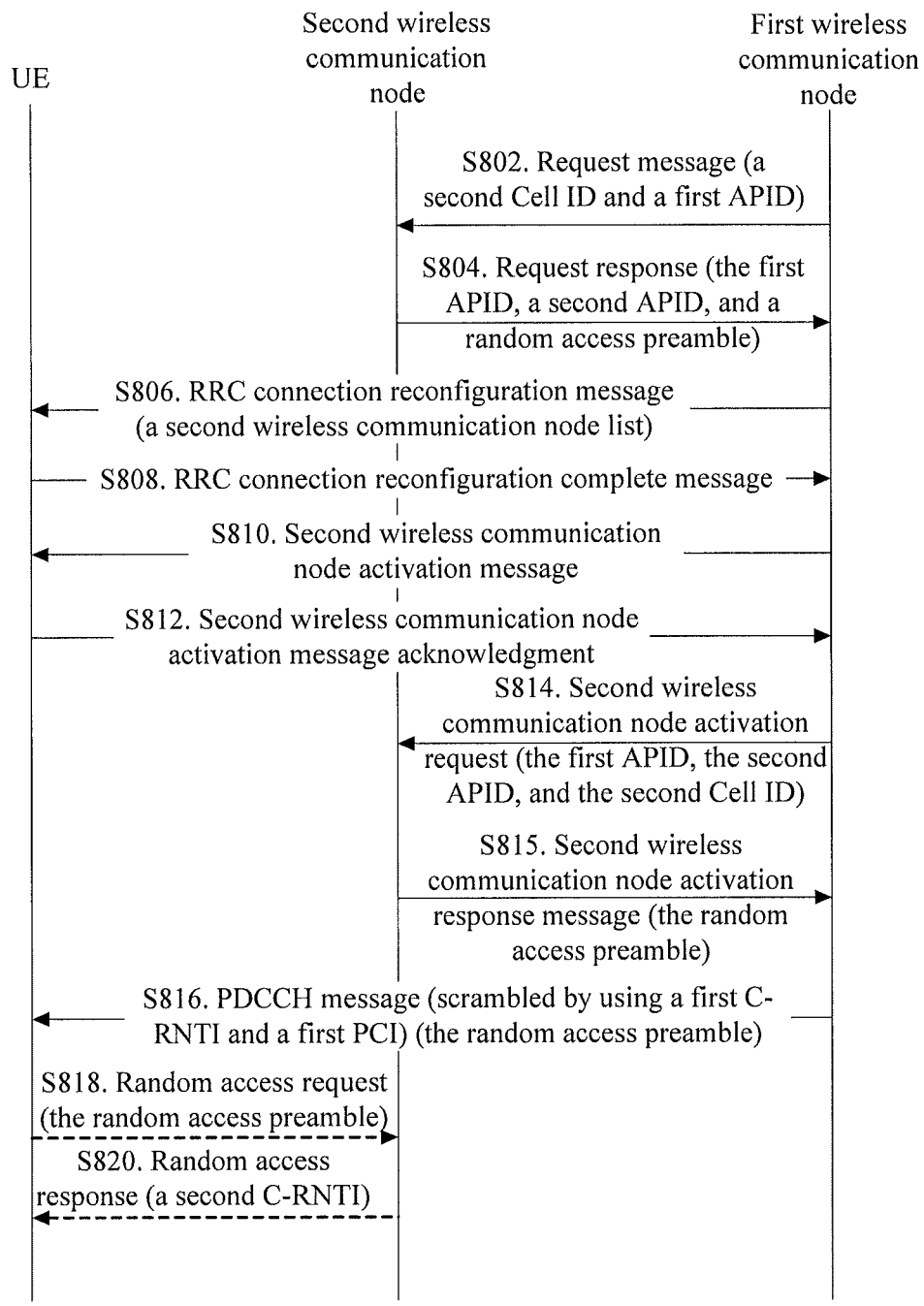
FIG. 8 is a signaling flowchart of Embodiment 8 of a method for accessing a wireless communication node according to the present invention.

FIG. 8 is a signaling flowchart of Embodiment 8 of a method for accessing a wireless communication node according to the present invention. As shown in FIG. 8, the method for accessing a wireless communication node is described by means of signaling interaction among a first wireless communication node, a second wireless communication node, and a UE in this embodiment, and a difference between this embodiment and the embodiment shown in FIG. 7 lies in that this embodiment is applicable to a case in which a first C-RNTI is not used by another UE in the second wireless communication node.

The method for accessing a wireless communication node provided in this embodiment may include:

S802 is the same as S702 in the embodiment shown in FIG. 7.

S804. The second wireless communication node sends a request response to the first wireless communication node.

The request response may include a first APID that is allocated by the first wireless communication node to the UE, and a second APID that is allocated by the second wireless communication node to the UE. In addition, the request response includes a random access preamble.

S806-S812 are respectively the same as S306-S312 in the embodiment shown in FIG. 3.

S814 and S815 are respectively the same as S714 and S715 in the embodiment shown in FIG. 7.

S816. The first wireless communication node sends a PDCCH message to the UE.

The PDCCH message is, for example, a PDCCH order, and the PDCCH message carries the random access preamble. The first wireless communication node may scramble the PDCCH message by using the first C-RNTI and a first PCI.

S818 and S820 are respectively the same as S318 and S320 in the embodiment shown in FIG. 3.

According to the method for accessing a wireless communication node provided in this embodiment, communication among a first wireless communication node that a UE has already accessed, a second wireless communication node that the UE expects to access, and the UE enables the first wireless communication node and the second wireless communication node to provide a service for the UE at the same time.

Figure 9:
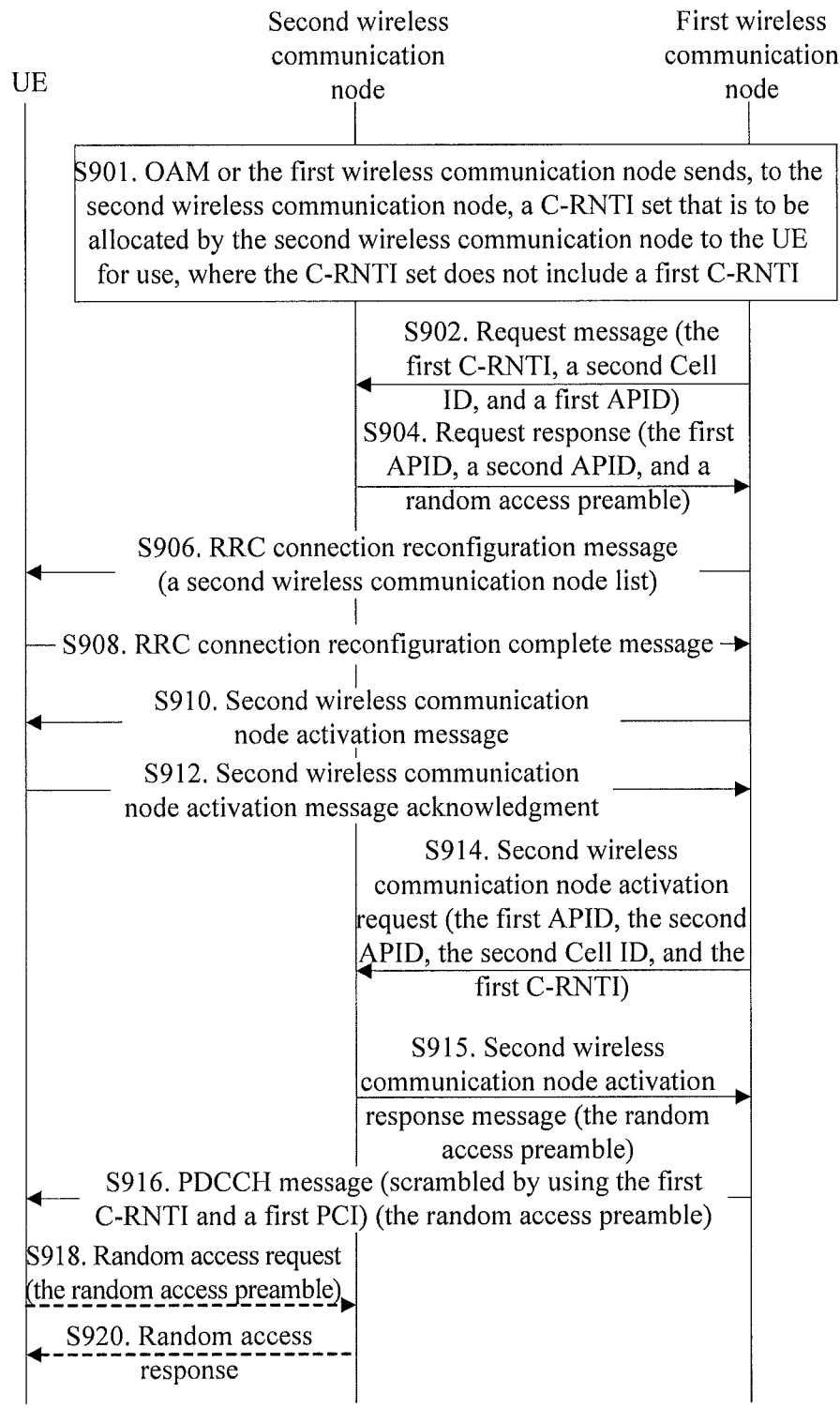
FIG. 9 is a signaling flowchart of Embodiment 9 of a method for accessing a wireless communication node according to the present invention.

FIG. 9 is a signaling flowchart of Embodiment 9 of a method for accessing a wireless communication node according to the present invention. As shown in FIG. 9, the method for accessing a wireless communication node is described by means of signaling interaction among a first wireless communication node, a second wireless communication node, and a UE in this embodiment, and a difference between this embodiment and the embodiment shown in FIG. 8 lies in that, in this embodiment, a C-RNTI set that is to be allocated by the second wireless communication node to the UE for use is sent to the second wireless communication node in advance.

The method for accessing a wireless communication node provided in this embodiment may include:

S901. OAM or the first wireless communication node sends, to the second wireless communication node, the C-RNTI set that is to be allocated by the second wireless communication node to the UE for use, where the C-RNTI set does not include a first C-RNTI.

It may be that the OAM or the first wireless communication node pre-allocates a C-RNTI set, for example, a C-RNTI interval or a C-RNTI list to the second wireless communication node; the second wireless communication node allocates a C-RNTI in the C-RNTI set to a UE served by the second wireless communication node, and the C-RNTI is used as a second C-RNTI of a UE that accesses the second wireless communication node. However, the first wireless communication node does not use a C-RNTI in the C-RNTI set as a first C-RNTI of a UE that accesses the first wireless communication node, thereby avoiding a case in which a C-RNTI used by the UE that accesses the second wireless communication node is repetitive.

S902 is the same as S302 in the embodiment shown in FIG. 3.

S904-S912 are respectively the same as S804-S812 in the embodiment shown in FIG. 8.

S914 is the same as S314 in the embodiment shown in FIG. 3.

S915-S918 are respectively the same as S815-S818 in the embodiment shown in FIG. 8.

S920. The second wireless communication node sends a random access response to the UE.

The second wireless communication node neither needs to determine whether a first C-RNTI of the UE and a C-RNTI used by another UE that has already accessed the second wireless communication node are repetitive, nor needs to allocate a second C-RNTI again.

According to the method for accessing a wireless communication node of a base station provided in this embodiment, communication among a first wireless communication node that a UE has already accessed, a second wireless communication node that the UE expects to access, and the UE enables the first wireless communication node and the second wireless communication node to provide a service for the UE at the same time. In addition, a second C-RNTI to be used by the UE is pre-allocated to the second wireless communication node, thereby avoiding a case in which the UE uses a same C-RNTI in the first wireless communication node and the second wireless communication node, so that the UE can correctly detect a PDCCH message and further accesses the second wireless communication node.

In addition, if contention-based random access instead of non-contention-based random access is used, the UE needs to select a random access preamble by itself to initiate random access to the second wireless communication node; then, in a case in which an existing carrier aggregation scheme is reused, a second wireless communication node activation request and a PDCCH message in the foregoing embodiments may not be required. Specifically, random access preambles may first be grouped, some of them are used by the UE to access the first wireless communication node, and others are used by the UE to access the second wireless communication node. In this way, after the UE receives the second wireless communication node activation message sent by the first wireless communication node, the UE initiates, by using a random access preamble used to access the second wireless communication node, random access to the second wireless communication node; and after receiving the random access preamble, the second wireless communication node determines, according to a value of the random access preamble, whether the UE expects to acquire a service of the second wireless communication node from the second wireless communication node, and if yes, an RRC connection does not need to be established for the UE.

In addition, in the foregoing embodiments, when an RRC reconfiguration message is used as the second wireless communication node activation message, the RRC reconfiguration message may also carry the random access preamble, so that subsequent sending of a PDCCH message is omitted.

Figure 10:
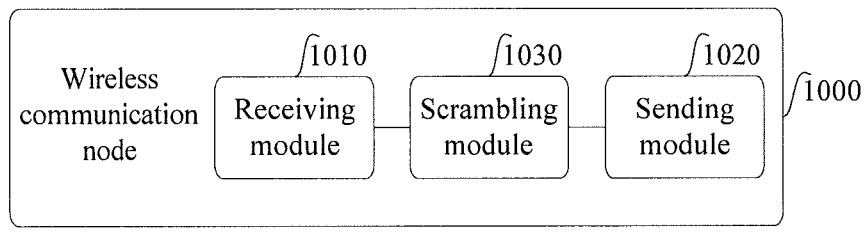
FIG. 10 is a schematic structural diagram of Embodiment 1 of a wireless communication node according to the present invention.

FIG. 10 is a schematic structural diagram of Embodiment 1 of a wireless communication node according to the present invention. As shown in FIG. 10, a wireless communication node 1000 provided in this embodiment may be the second wireless communication node in the foregoing method embodiments. The wireless communication node 1000 may include: a receiving module 1010 and a sending module 1020, and preferably, the wireless communication node 1000 may further include a scrambling module 1030. Specifically, the receiving module 1010 is configured to receive a request message that is sent by a first wireless communication node and used to request the second wireless communication node to provide a service for a user equipment UE; and the sending module 1020 is configured to send a request response to the first wireless communication node; where the receiving module 1010 is further configured to receive a second wireless communication node activation request that is sent by the first wireless communication node after the first wireless communication node sends a second wireless communication node activation message to the UE; and the sending module 1020 is further configured to send a random access indication message, so that the UE accesses the second wireless communication node in a case in which the UE accesses the first wireless communication node.

The wireless communication node 1000 in this embodiment may be configured to execute the technical solution in the method embodiment shown in FIG. 1, and implementation principles and technical effects thereof are similar and are not described herein again.

Preferably, the sending module 1020 is specifically configured to send, to the UE, a physical downlink control channel PDCCH message that includes a random access preamble, so that the UE accesses the second wireless communication node according to the random access preamble in a case in which the UE accesses the first wireless communication node.

Preferably, the request message or the second wireless communication node activation request includes a random access preamble that is allocated by the first wireless communication node to the UE and used to access the second wireless communication node; and the sending module 1020 is specifically configured to send, to the UE, a PDCCH message that includes the random access preamble that is allocated by the first wireless communication node to the UE and used to access the second wireless communication node.

Preferably, the request message includes a first cell radio network temporary identifier C-RNTI used in the first wireless communication node by the UE, or the second wireless communication node activation request includes a first C-RNTI; and the scrambling module 1030 is configured to scramble the PDCCH message by using the first C-RNTI and a first physical cell identifier PCI of the first wireless communication node, or scramble the PDCCH message by using the first C-RNTI and a second PCI of the second wireless communication node.

Preferably, the receiving module 1010 is further configured to receive a random access request that is sent by the UE and includes the random access preamble.

Preferably, the receiving module 1010 is further configured to receive a C-RNTI set that is sent by an operation, administration and maintenance OAM unit or the first wireless communication node and that is to be allocated by the second wireless communication node to the UE for use, where the C-RNTI set does not include the first C-RNTI.

Preferably, the request response includes a second C-RNTI that is allocated by the second wireless communication node to the UE, so that the first wireless communication node sends the second C-RNTI to the UE; and correspondingly, the scrambling module 1030 is configured to scramble the PDCCH message by using the second C-RNTI and a second PCI of the second wireless communication node.

Preferably, the sending module 1020 is specifically configured to send, to the first wireless communication node, a second wireless communication node activation response message that includes a random access preamble allocated by the second wireless communication node, so that the first wireless communication node sends, to the UE, a PDCCH message that includes the random access preamble, and then the UE accesses the second wireless communication node according to the random access preamble in a case in which the UE accesses the first wireless communication node.

Preferably, the request response or the second wireless communication node activation response message includes a second C-RNTI that is allocated by the second wireless communication node to the UE, so that the first wireless communication node scrambles the PDCCH message by using the second C-RNTI.

Preferably, the request message includes a first C-RNTI used in the first wireless communication node by the UE, or the second wireless communication node activation request includes a first C-RNTI, and the second wireless communication node serves the UE by using the first C-RNTI.

Preferably, the receiving module 1010 is further configured to receive a random access request that is sent by the UE and includes the random access preamble.

Preferably, receive a C-RNTI set that is sent by an operation, administration and maintenance OAM unit or the first wireless communication node and that is to be allocated by the second wireless communication node to the UE for use, where the C-RNTI set does not include the first C-RNTI.

Preferably, the sending module 1020 is further configured to send, to the UE, a random access response that includes a second C-RNTI, where the second C-RNTI is a C-RNTI that is allocated by the second wireless communication node to the UE.

Preferably, the request message includes: a UE context setup request, a bearer setup request, a handover request, a coordinated service request, or a secondary cell transmission request.

Preferably, the request message includes: an application-layer protocol identifier APID that is allocated by the first wireless communication node to the UE, and an identifier of the second wireless communication node.

Preferably, the identifier of the second wireless communication node includes one or a combination of: an E-UTRAN cell global identifier, the second physical cell identifier PCI, and a frequency of the second wireless communication node that are corresponding to the second wireless communication node.

The wireless communication node 1000 in this embodiment may be configured to perform steps that are correspondingly completed on a second wireless communication node side in the technical solutions in the method embodiments shown in FIG. 3 to FIG. 9, and implementation principles and technical effects thereof are similar and are not described herein again.

Figure 11:
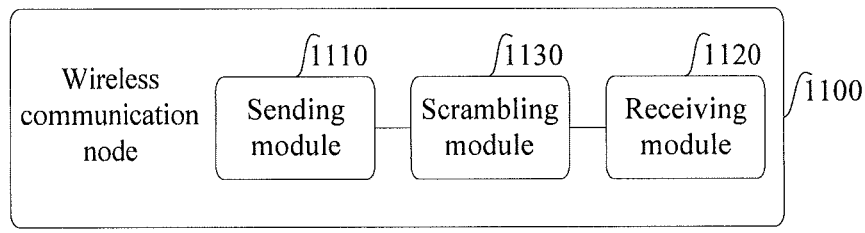
FIG. 11 is a schematic structural diagram of Embodiment 2 of a wireless communication node according to the present invention.

FIG. 11 is a schematic structural diagram of Embodiment 2 of a wireless communication node according to the present invention. As shown in FIG. 11, a wireless communication node 1100 provided in this embodiment may be the first wireless communication node in the foregoing method embodiments. The wireless communication node 1100 may include: a sending module 1110 and a receiving module 1120, and preferably, the wireless communication node 1100 may further include a scrambling module 1130. Specifically, the sending module 1110 is configured to send, to a second wireless communication node, a request message used to request the second wireless communication node to provide a service for a user equipment UE; and the receiving module 1120 is configured to receive a request response sent by the second wireless communication node; where the sending module 1110 is further configured to send a second wireless communication node activation message to the UE; and the sending module 1110 is further configured to send a second wireless communication node activation request to the second wireless communication node, so that the second wireless communication node sends a random access indication message to instruct the UE to access the second wireless communication node in a case in which the UE accesses the first wireless communication node.

The wireless communication node 1100 in this embodiment may be configured to execute the technical solution in the method embodiment shown in FIG. 2, and implementation principles and technical effects thereof are similar and are not described herein again.

Preferably, the sending module 1110 is specifically configured to send the second wireless communication node activation request to the second wireless communication node, so that the second wireless communication node sends, to the UE, a physical downlink control channel PDCCH message that includes a random access preamble, so as to instruct the UE to access the second wireless communication node according to the random access preamble in a case in which the UE accesses the first wireless communication node.

Preferably, the request message or the second wireless communication node activation request includes a random access preamble that is allocated by the first wireless communication node to the UE and used to access the second wireless communication node; and the sending module 1110 is further configured to send the second wireless communication node activation request to the second wireless communication node, so that the second wireless communication node sends, to the UE, a PDCCH message that includes the random access preamble that is allocated by the first wireless communication node to the UE and used to access the second wireless communication node, so as to instruct the UE to access the second wireless communication node according to the random access preamble allocated by the first wireless communication node.

Preferably, the request message includes a first cell radio network temporary identifier C-RNTI used in the first wireless communication node by the UE, or the second wireless communication node activation request includes a first C-RNTI, so that before sending, to the UE, the PDCCH message that includes the random access preamble, the second wireless communication node scrambles the PDCCH message by using the first C-RNTI and a physical cell identifier PCI of the first wireless communication node, or scrambles the PDCCH message by using the first C-RNTI and a second PCI of the second wireless communication node.

Preferably, the sending module 1110 is further configured to send the second wireless communication node activation request to the second wireless communication node, so that after sending, to the UE, the PDCCH message that includes the random access preamble, the second wireless communication node receives a random access request that is sent by the UE and includes the random access preamble.

Preferably, the sending module 1110 is further configured to send, to the second wireless communication node, a C-RNTI set that is to be allocated by the second wireless communication node to the UE for use, where the C-RNTI set does not include the first C-RNTI.

Preferably, the request response includes a second C-RNTI that is allocated by the second wireless communication node to the UE, and correspondingly, the sending module 1110 is further configured to send the second C-RNTI to the UE.

Preferably, the receiving module 1120 is further configured to receive a second wireless communication node activation response message that is sent by the second wireless communication node and includes a random access preamble allocated by the second wireless communication node; and the sending module 1110 is further configured to send, to the UE, a PDCCH message that includes the random access preamble, so that the UE accesses the second wireless communication node according to the random access preamble in a case in which the UE accesses the first wireless communication node.

Preferably, the request response or the second wireless communication node activation response message includes a second C-RNTI that is allocated by the second wireless communication node to the UE, and correspondingly, the scrambling module 1130 is configured to scramble the PDCCH message by using the second C-RNTI and a first physical cell identifier PCI of the first wireless communication node.

Preferably, the scrambling module 1130 is configured to scramble the PDCCH message by using a first C-RNTI and a first physical cell identifier PCI of the first wireless communication node, where the first C-RNTI is a C-RNTI used in the first wireless communication node by the UE.

Preferably, the request message includes the first C-RNTI used in the first wireless communication node by the UE, or the second wireless communication node activation request includes the first C-RNTI, so that the second wireless communication node serves the UE by using the first C-RNTI.

Preferably, the sending module 1110 is specifically configured to send, to the UE, the PDCCH message that includes the random access preamble, so that the UE sends, to the second wireless communication node, a random access request that includes the random access preamble.

Preferably, the sending module 1110 is specifically configured to send, to the second wireless communication node, a C-RNTI set that is to be allocated by the second wireless communication node to the UE for use, where the C-RNTI set does not include the first C-RNTI.

Preferably, the request message includes: a UE context setup request, a bearer setup request, a handover request, a coordinated service request, or a secondary cell transmission request.

Preferably, the request message includes: an application-layer protocol identifier APID that is allocated by the first wireless communication node to the UE, and an identifier of the second wireless communication node.

Preferably, the identifier of the second wireless communication node includes one or a combination of: an E-UTRAN cell global identifier, the second physical cell identifier PCI, and a frequency of the second wireless communication node that are corresponding to the second wireless communication node.

The wireless communication node 1100 provided in this embodiment may be configured to perform steps that are correspondingly completed on a first wireless communication node side in the technical solutions in the method embodiments shown in FIG. 3 to FIG. 9, and implementation principles and technical effects thereof are similar and are not described herein again.

An embodiment of the present invention further provides a system for accessing a wireless communication node. The system may include the wireless communication node 1000 shown in FIG. 10 and the wireless communication node 1100 shown in FIG. 11. The system for accessing a wireless communication node in this embodiment may be configured to execute the technical solutions in the method embodiments shown in FIG. 3 to FIG. 9, and implementation principles and technical effects thereof are similar and are not described herein again.

Figure 12:
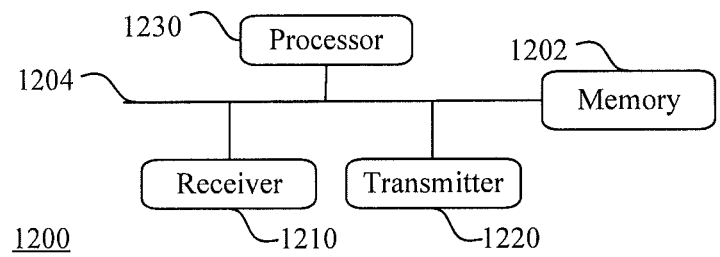
FIG. 12 is a schematic structural diagram of Embodiment 3 of a wireless communication node according to the present invention.

FIG. 12 is a schematic structural diagram of Embodiment 3 of a wireless communication node according to the present invention. As shown in FIG. 12, a wireless communication node 1200 provided in this embodiment may be the second wireless communication node in the foregoing method embodiments. The wireless communication node 1200 may include: a receiver 1210, a transmitter 1220, and a processor 1230, and preferably, the wireless communication node 1200 may further include a memory 1202 and a communication bus 1204. The communication bus 1204 is configured to implement connections and communication between these apparatuses. The memory 1202 may include a high speed RAM memory, or may include a non-volatile memory, for example, at least one magnetic disk memory. Optionally, the memory 1202 may include at least one storage apparatus. Specifically, the receiver 1210 is configured to receive a request message that is sent by a first wireless communication node and used to request the second wireless communication node to provide a service for a user equipment UE; and the transmitter 1220 is configured to send a request response to the first wireless communication node; where the receiver 1210 is further configured to receive a second wireless communication node activation request that is sent by the first wireless communication node after the first wireless communication node sends a second wireless communication node activation message to the UE; and the transmitter 1220 is further configured to send a random access indication message, so that the UE accesses the second wireless communication node in a case in which the UE accesses the first wireless communication node.

The wireless communication node 1200 in this embodiment may be configured to execute the technical solution in the method embodiment shown in FIG. 1, and implementation principles and technical effects thereof are similar and are not described herein again.

Preferably, the transmitter 1220 is specifically configured to send, to the UE, a physical downlink control channel PDCCH message that includes a random access preamble, so that the UE accesses the second wireless communication node according to the random access preamble in a case in which the UE accesses the first wireless communication node.

Preferably, the request message or the second wireless communication node activation request includes a random access preamble that is allocated by the first wireless communication node to the UE and used to access the second wireless communication node; and the transmitter 1220 is specifically configured to send, to the UE, a PDCCH message that includes the random access preamble that is allocated by the first wireless communication node to the UE and used to access the second wireless communication node.

Preferably, the request message includes a first cell radio network temporary identifier C-RNTI used in the first wireless communication node by the UE, or the second wireless communication node activation request includes a first C-RNTI; and correspondingly, the processor 1230 is configured to scramble the PDCCH message by using the first C-RNTI and a first physical cell identifier PCI of the first wireless communication node, or scramble the PDCCH message by using the first C-RNTI and a second PCI of the second wireless communication node.

Preferably, the receiver 1210 is further configured to receive a random access request that is sent by the UE and includes the random access preamble.

Preferably, the receiver 1210 is further configured to receive a C-RNTI set that is sent by an operation, administration and maintenance OAM unit or the first wireless communication node and that is to be allocated by the second wireless communication node to the UE for use, where the C-RNTI set does not include the first C-RNTI.

Preferably, the request response includes a second C-RNTI that is allocated by the second wireless communication node to the UE, so that the first wireless communication node sends the second C-RNTI to the UE; and correspondingly, the processor 1230 is configured to scramble the PDCCH message by using the second C-RNTI and a second PCI of the second wireless communication node.

Preferably, the transmitter 1220 is specifically configured to send, to the first wireless communication node, a second wireless communication node activation response message that includes a random access preamble allocated by the second wireless communication node, so that the first wireless communication node sends, to the UE, a PDCCH message that includes the random access preamble, and then the UE accesses the second wireless communication node according to the random access preamble in a case in which the UE accesses the first wireless communication node.

Preferably, the request response or the second wireless communication node activation response message includes a second C-RNTI that is allocated by the second wireless communication node to the UE, so that the first wireless communication node scrambles the PDCCH message by using the second C-RNTI.

Preferably, the request message includes a first C-RNTI used in the first wireless communication node by the UE, or the second wireless communication node activation request includes a first C-RNTI, and the second wireless communication node serves the UE by using the first C-RNTI.

Preferably, the receiver 1210 is further configured to receive a random access request that is sent by the UE and includes the random access preamble.

Preferably, receive a C-RNTI set that is sent by an operation, administration and maintenance OAM unit or the first wireless communication node and that is to be allocated by the second wireless communication node to the UE for use, where the C-RNTI set does not include the first C-RNTI.

Preferably, the transmitter 1220 is further configured to send, to the UE, a random access response that includes a second C-RNTI, where the second C-RNTI is a C-RNTI that is allocated by the second wireless communication node to the UE.

Preferably, the request message includes: a UE context setup request, a bearer setup request, a handover request, a coordinated service request, or a secondary cell transmission request.

Preferably, the request message includes: an application-layer protocol identifier APID that is allocated by the first wireless communication node to the UE, and an identifier of the second wireless communication node.

Preferably, the identifier of the second wireless communication node includes one or a combination of: an E-UTRAN cell global identifier, the second physical cell identifier PCI, and a frequency of the second wireless communication node that are corresponding to the second wireless communication node.

The wireless communication node 1200 in this embodiment may be configured to perform steps that are correspondingly completed on a second wireless communication node side in the technical solutions in the method embodiments shown in FIG. 3 to FIG. 9, and implementation principles and technical effects thereof are similar and are not described herein again.

Figure 13:
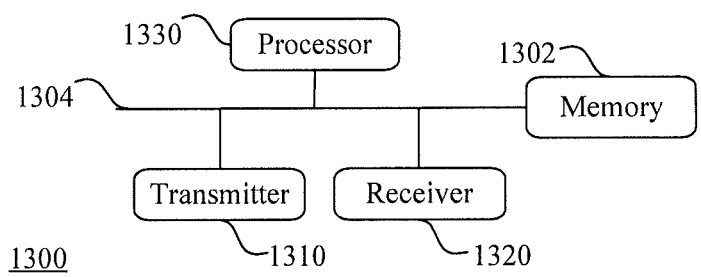
FIG. 13 is a schematic structural diagram of Embodiment 4 of a wireless communication node according to the present invention.

FIG. 13 is a schematic structural diagram of Embodiment 4 of a wireless communication node according to the present invention. As shown in FIG. 13, a wireless communication node 1300 provided in this embodiment may be the first wireless communication node in the foregoing method embodiments. The wireless communication node 1300 may include: a transmitter 1310, a receiver 1320, and a processor 1330, and preferably, the wireless communication node 1300 may further include a memory 1302 and a communication bus 1304. The communication bus 1304 is configured to implement connections and communication between these apparatuses. The memory 1302 may include a high speed RAM memory, or may include a non-volatile memory, for example, at least one magnetic disk memory. Optionally, the memory 1302 may include at least one storage apparatus. Specifically, the transmitter 1310 is configured to send, to a second wireless communication node, a request message used to request the second wireless communication node to provide a service for a user equipment UE; and the receiver 1320 is configured to receive a request response sent by the second wireless communication node; where the transmitter 1310 is further configured to send a second wireless communication node activation message to the UE; and the transmitter 1310 is further configured to send a second wireless communication node activation request to the second wireless communication node, so that the second wireless communication node sends a random access indication message to instruct the UE to access the second wireless communication node in a case in which the UE accesses the first wireless communication node.

The wireless communication node 1300 in this embodiment may be configured to execute the technical solution in the method embodiment shown in FIG. 2, and implementation principles and technical effects thereof are similar and are not described herein again.

Preferably, the transmitter 1310 is specifically configured to send the second wireless communication node activation request to the second wireless communication node, so that the second wireless communication node sends, to the UE, a physical downlink control channel PDCCH message that includes a random access preamble, so as to instruct the UE to access the second wireless communication node according to the random access preamble in a case in which the UE accesses the first wireless communication node.

Preferably, the request message or the second wireless communication node activation request includes a random access preamble that is allocated by the first wireless communication node to the UE and used to access the second wireless communication node; and the transmitter 1310 is further configured to send the second wireless communication node activation request to the second wireless communication node, so that the second wireless communication node sends, to the UE, a PDCCH message that includes the random access preamble that is allocated by the first wireless communication node to the UE and used to access the second wireless communication node, so as to instruct the UE to access the second wireless communication node according to the random access preamble allocated by the first wireless communication node.

Preferably, the request message includes a first cell radio network temporary identifier C-RNTI used in the first wireless communication node by the UE, or the second wireless communication node activation request includes a first C-RNTI, so that before sending, to the UE, the PDCCH message that includes the random access preamble, the second wireless communication node scrambles the PDCCH message by using the first C-RNTI and a physical cell identifier PCI of the first wireless communication node, or scrambles the PDCCH message by using the first C-RNTI and a second PCI of the second wireless communication node.

Preferably, the transmitter 1310 is further configured to send the second wireless communication node activation request to the second wireless communication node, so that after sending, to the UE, the PDCCH message that includes the random access preamble, the second wireless communication node receives a random access request that is sent by the UE and includes the random access preamble.

Preferably, the transmitter 1310 is further configured to send, to the second wireless communication node, a C-RNTI set that is to be allocated by the second wireless communication node to the UE for use, where the C-RNTI set does not include the first C-RNTI.

Preferably, the request response includes a second C-RNTI that is allocated by the second wireless communication node to the UE; and correspondingly, the transmitter 1310 is further configured to send the second C-RNTI to the UE.

Preferably, the receiver 1320 is further configured to receive a second wireless communication node activation response message that is sent by the second wireless communication node and includes a random access preamble allocated by the second wireless communication node; and the transmitter 1310 is further configured to send, to the UE, a PDCCH message that includes the random access preamble, so that the UE accesses the second wireless communication node according to the random access preamble in a case in which the UE accesses the first wireless communication node.

Preferably, the request response or the second wireless communication node activation response message includes a second C-RNTI that is allocated by the second wireless communication node to the UE; and correspondingly, the processor 1330 is configured to scramble the PDCCH message by using the second C-RNTI and a first physical cell identifier PCI of the first wireless communication node.

Preferably, the processor 1330 is configured to scramble the PDCCH message by using a first C-RNTI and a first physical cell identifier PCI of the first wireless communication node, where the first C-RNTI is a C-RNTI used in the first wireless communication node by the UE.

Preferably, the request message includes the first C-RNTI used in the first wireless communication node by the UE, or the second wireless communication node activation request includes the first C-RNTI, so that the second wireless communication node serves the UE by using the first C-RNTI.

Preferably, the transmitter 1310 is specifically configured to send, to the UE, the PDCCH message that includes the random access preamble, so that the UE sends, to the second wireless communication node, a random access request that includes the random access preamble.

Preferably, the transmitter 1310 is specifically configured to send, to the second wireless communication node, a C-RNTI set that is to be allocated by the second wireless communication node to the UE for use, where the C-RNTI set does not include the first C-RNTI.

Preferably, the request message includes: a UE context setup request, a bearer setup request, a handover request, a coordinated service request, or a secondary cell transmission request.

Preferably, the request message includes: an application-layer protocol identifier APID that is allocated by the first wireless communication node to the UE, and an identifier of the second wireless communication node.

Preferably, the identifier of the second wireless communication node includes one or a combination of: an E-UTRAN cell global identifier, the second physical cell identifier PCI, and a frequency of the second wireless communication node that are corresponding to the second wireless communication node.

The wireless communication node 1300 in this embodiment may be configured to perform steps that are correspondingly completed on a first wireless communication node side in the technical solutions in the method embodiments shown in FIG. 3 to FIG. 9, and implementation principles and technical effects thereof are similar and are not described herein again.

An embodiment of the present invention further provides a system for accessing a wireless communication node. The system may include the wireless communication node 1200 shown in FIG. 12 and the wireless communication node 1300 shown in FIG. 13. The system for accessing a wireless communication node in this embodiment may be configured to execute the technical solutions in the method embodiments shown in FIG. 3 to FIG. 9, and implementation principles and technical effects thereof are similar and are not described herein again.

In conclusion, according to the method for accessing a wireless communication node, the wireless communication node, and the system for accessing a wireless communication node provided in the embodiments of the present invention, communication among a first wireless communication node that a UE has already accessed, a second wireless communication node that the UE expects to access, and the UE enables the first wireless communication node and the second wireless communication node to provide a service for the UE at the same time.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A method for accessing a wireless communication node, comprising:
   receiving, by a second wireless communication node, a request message that is sent by a first wireless communication node and used to request the second wireless communication node to provide a service for a user equipment (UE), the request message including: a first application-layer protocol identifier (APID) allocated by the first wireless communication node to the UE, and an identifier of the second wireless communication node;
   sending, by the second wireless communication node, a request response to the first wireless communication node, the request response including the first APID and a second APID allocated by the second wireless communication node to the UE;
   receiving, by the second wireless communication node, a second wireless communication node activation request that is sent by the first wireless communication node after the first wireless communication node sends a second wireless communication node activation message to the UE, the second wireless communication node activation request including the first APID and the second APID; and
   sending, by the second wireless communication node, a random access indication message, so that the UE accesses the second wireless communication node in a case in which the UE accesses the first wireless communication node.

2. The method according to claim 1, wherein the sending, by the second wireless communication node, a random access indication message, so that the UE accesses the second wireless communication node in a case in which the UE accesses the first wireless communication node comprises:
   sending, by the second wireless communication node to the UE, a physical downlink control channel (PDCCH) message that comprises a random access preamble, so that the UE accesses the second wireless communication node according to the random access preamble in a case in which the UE accesses the first wireless communication node.

3. The method according to claim 2, wherein:
   after the sending, by the second wireless communication node to the UE, a PDCCH message that comprises a random access preamble, the method further comprises:
   receiving, by the second wireless communication node, a random access request that is sent by the UE and comprises the random access preamble.

4. The method according to claim 1, wherein the request message comprises:
   a UE context setup request, a bearer setup request, a handover request, a coordinated service request, or a secondary cell transmission request.

5. A method for accessing a wireless communication node, comprising:
   receiving, by a second wireless communication node, a request message that is sent by a first wireless communication node and used to request the second wireless communication node to provide a service for a user equipment (UE);
   sending, by the second wireless communication node, a request response to the first wireless communication node;
   receiving, by the second wireless communication node, a second wireless communication node activation request that is sent by the first wireless communication node after the first wireless communication node sends a second wireless communication node activation message to the UE; and
   sending, by the second wireless communication node, a random access indication message, so that the UE accesses the second wireless communication node in a case in which the UE accesses the first wireless communication node, wherein the sending, by the second wireless communication node, a random access indication message, so that the UE accesses the second wireless communication node in a case in which the UE accesses the first wireless communication node comprises:
   sending, by the second wireless communication node to the UE, a physical downlink control channel (PDCCH)

message that comprises a random access preamble, so that the UE accesses the second wireless communication node according to the random access preamble in a case in which the UE accesses the first wireless communication node, wherein the request message or the second wireless communication node activation request comprises a random access preamble that is allocated by the first wireless communication node to the UE and used to access the second wireless communication node; and the sending, by the second wireless communication node to the UE, a PDCCH message that comprises a random access preamble comprises:

sending, by the second wireless communication node to the UE, a PDCCH message that comprises the random access preamble allocated by the first wireless communication node.

6. A method for accessing a wireless communication node, comprising:

receiving, by a second wireless communication node, a request message that is sent by a first wireless communication node and used to request the second wireless communication node to provide a service for a user equipment (UE);

sending, by the second wireless communication node, a request response to the first wireless communication node;

receiving, by the second wireless communication node, a second wireless communication node activation request that is sent by the first wireless communication node after the first wireless communication node sends a second wireless communication node activation message to the UE; and sending, by the second wireless communication node, a random access indication message, so that the UE accesses the second wireless communication node in a case in which the UE accesses the first wireless communication node, wherein the sending, by the second wireless communication node, a random access indication message, so that the UE accesses the second wireless communication node in a case in which the UE accesses the first wireless communication node comprises:

sending, by the second wireless communication node to the first wireless communication node, a second wireless communication node activation response message that comprises a random access preamble allocated by the second wireless communication node, so that the first wireless communication node sends, to the UE, a PDCCH message that comprises the random access preamble, and then the UE accesses the second wireless communication node according to the random access preamble in a case in which the UE accesses the first wireless communication node.

7. A method for accessing a wireless communication node, comprising:

receiving, by a second wireless communication node, a request message that is sent by a first wireless communication node and used to request the second wireless communication node to provide a service for a user equipment (UE);

sending, by the second wireless communication node, a request response to the first wireless communication node;

receiving, by the second wireless communication node, a second wireless communication node activation request that is sent by the first wireless communication node after the first wireless communication node sends a second wireless communication node activation message to the UE; and sending, by the second wireless communication node, a random access indication message, so that the UE accesses the second wireless communication node in a case in which the UE accesses the first wireless communication node, wherein the sending, by the second wireless communication node, a random access indication message, so that the UE accesses the second wireless communication node in a case in which the UE accesses the first wireless communication node comprises:

sending, by the second wireless communication node to the UE, a physical downlink control channel (PDCCH) message that comprises a random access preamble, so that the UE accesses the second wireless communication node according to the random access preamble in a case in which the UE accesses the first wireless communication node, wherein the request message comprises a first cell radio network temporary identifier (C-RNTI) used in the first wireless communication node by the UE, or the second wireless communication node activation request comprises the first C-RNTI; and before the sending, by the second wireless communication node to the UE, a PDCCH message that comprises a random access preamble, the method further comprises:

scrambling, by the second wireless communication node, the PDCCH message by using the first C-RNTI and a first physical cell identifier (PCI) of the first wireless communication node, or scrambling, by the second wireless communication node, the PDCCH message by using the first C-RNTI and a second PCI of the second wireless communication node.

8. A method for accessing a wireless communication node, comprising:

sending, by a first wireless communication node to a second wireless communication node, a request message used to request the second wireless communication node to provide a service for a user equipment (UE), the request message including: a first application-layer protocol identifier (APID) allocated by the first wireless communication node to the UE, and an identifier of the second wireless communication node;

receiving, by the first wireless communication node, a request response sent by the second wireless communication node, the request response including the first APID and a second APID allocated by the second wireless communication node to the UE;

sending, by the first wireless communication node, a second wireless communication node activation message to the UE, the second wireless communication node activation request including the first APID and the second APID; and sending, by the first wireless communication node, a second wireless communication node activation request to the second wireless communication node, so that the second wireless communication node sends a random access indication message to instruct the UE to access the second wireless communication node in a case in which the UE accesses the first wireless communication node.

9. The method according to claim 8, wherein the sending, by the first wireless communication node, a second wireless communication node activation request to the second wireless communication node, so that the second wireless communication node sends a random access indication message to instruct the UE to access the second wireless communication node in a case in which the UE accesses the first wireless communication node comprises:
sending, by the first wireless communication node, the second wireless communication node activation request to the second wireless communication node, so that the second wireless communication node sends, to the UE, a physical downlink control channel (PDCCH) message that comprises a random access preamble, so as to instruct the UE to access the second wireless communication node according to the random access preamble in a case in which the UE accesses the first wireless communication node.

10. The method according to claim 9, wherein:
the first wireless communication node sends the second wireless communication node activation request to the second wireless communication node, so that after sending, to the UE, the PDCCH message that comprises the random access preamble, the second wireless communication node receives a random access request that is sent by the UE and comprises the random access preamble.

11. The method according to claim 8, wherein the request message comprises:
a UE context setup request, a bearer setup request, a handover request, a coordinated service request, or a secondary cell transmission request.

12. A method for accessing a wireless communication node, comprising:
sending, by a first wireless communication node to a second wireless communication node, a request message used to request the second wireless communication node to provide a service for a user equipment (UE);
receiving, by the first wireless communication node, a request response sent by the second wireless communication node;
sending, by the first wireless communication node, a second wireless communication node activation message to the UE; and
sending, by the first wireless communication node, a second wireless communication node activation request to the second wireless communication node, so that the second wireless communication node sends a random access indication message to instruct the UE to access the second wireless communication node in a case in which the UE accesses the first wireless communication node wherein the sending by the first wireless communication node, a second wireless communication node activation request to the second wireless communication node, so that the second wireless communication node sends a random access indication message to instruct the UE to access the second wireless communication node in a case in which the UE accesses the first wireless communication node comprises:
sending, by the first wireless communication node, the second wireless communication node activation request to the second wireless communication node, so that the second wireless communication node sends, to the UE, a physical downlink control channel (PDCCH) message that comprises a random access preamble, so as to instruct the UE to access the second wireless communication node according to the random access preamble in a case in which the UE accesses the first wireless communication node, wherein the request message or the second wireless communication node activation request comprises a random access preamble that is allocated by the first wireless communication node to the UE and used to access the second wireless communication node; and
the sending, by the first wireless communication node, the second wireless communication node activation request to the second wireless communication node, so that the second wireless communication node sends, to the UE, a PDCCH message that comprises a random access preamble, so as to instruct the UE to access the second wireless communication node according to the random access preamble comprises:
sending, by the first wireless communication node, the second wireless communication node activation request to the second wireless communication node, so that the second wireless communication node sends, to the UE, a PDCCH message that comprises the random access preamble allocated by the first wireless communication node, so as to instruct the UE to access the second wireless communication node according to the random access preamble allocated by the first wireless communication node.

13. A method for accessing a wireless communication node, comprising:
sending, by a first wireless communication node to a second wireless communication node, a request message used to request the second wireless communication node to provide a service for a user equipment (UE);
receiving, by the first wireless communication node, a request response sent by the second wireless communication node;
sending, by the first wireless communication node, a second wireless communication node activation message to the UE; and
sending, by the first wireless communication node, a second wireless communication node activation request to the second wireless communication node, so that the second wireless communication node sends a random access indication message to instruct the UE to access the second wireless communication node in a case in which the UE accesses the first wireless communication node, wherein after the sending, by the first wireless communication node, a second wireless communication node activation request to the second wireless communication node, the method further comprises:
receiving, by the first wireless communication node, a second wireless communication node activation response message that is sent by the second wireless communication node and comprises a random access preamble allocated by the second wireless communication node; and
sending, by the first wireless communication node to the UE, a PDCCH message that comprises the random access preamble, so that the UE accesses the second wireless communication node according to the random access preamble in a case in which the UE accesses the first wireless communication node.

14. A method for accessing a wireless communication node, comprising:
sending, by a first wireless communication node to a second wireless communication node, a request message used to request the second wireless communication node to provide a service for a user equipment (UE);

receiving, by the first wireless communication node, a request response sent by the second wireless communication node;

sending, by the first wireless communication node, a second wireless communication node activation message to the UE; and sending, by the first wireless communication node, a second wireless communication node activation request to the second wireless communication node, so that the second wireless communication node sends a random access indication message to instruct the UE to access the second wireless communication node in a case in which the UE accesses the first wireless communication node, wherein the sending, by the first wireless communication node, a second wireless communication node activation request to the second wireless communication node, so that the second wireless communication node sends a random access indication message to instruct the UE to access the second wireless communication node in a case in which the UE accesses the first wireless communication node comprises:

sending, by the first wireless communication node, the second wireless communication node activation request to the second wireless communication node, so that the second wireless communication node sends, to the UE, a physical downlink control channel (PDCCH) message that comprises a random access preamble, so as to instruct the UE to access the second wireless communication node according to the random access preamble in a case in which the UE accesses the first wireless communication node, wherein the request message comprises a first cell radio network temporary identifier (C-RNTI) used in the first wireless communication node by the UE, or the second wireless communication node activation request comprises the first C-RNTI, so that before sending, to the UE, the PDCCH message that comprises the random access preamble, the second wireless communication node scrambles the PDCCH message by using the first C-RNTI and a physical cell identifier (PCI) of the first wireless communication node, or scrambles the PDCCH message by using the first C-RNTI and a second PCI of the second wireless communication node.

\* \* \* \* \*